US010381159B2

(12) United States Patent
Imaeda et al.

(10) Patent No.: US 10,381,159 B2
(45) Date of Patent: Aug. 13, 2019

(54) MULTILAYER CERAMIC CAPACITOR

(71) Applicant: TDK CORPORATION, Tokyo (JP)

(72) Inventors: Takuya Imaeda, Tokyo (JP); Toshihiro Iguchi, Tokyo (JP); Satoshi Takahara, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/497,926

(22) Filed: Apr. 26, 2017

(65) Prior Publication Data

US 2017/0345571 A1    Nov. 30, 2017

(30) Foreign Application Priority Data

May 24, 2016 (JP) ................................. 2016-103071

(51) Int. Cl.
*H01G 4/30*     (2006.01)
*H01G 4/012*    (2006.01)
*H01G 4/005*    (2006.01)
*H01G 4/12*     (2006.01)
*H01G 4/248*    (2006.01)

(52) U.S. Cl.
CPC ............... *H01G 4/30* (2013.01); *H01G 4/005* (2013.01); *H01G 4/012* (2013.01); *H01G 4/1236* (2013.01); *H01G 4/248* (2013.01)

(58) Field of Classification Search
CPC ........... H01G 4/005; H01G 4/30; H01G 4/012
USPC ............................................. 361/303, 301.4
See application file for complete search history.

(56) References Cited

U.S. PATENT DOCUMENTS

| | | | | |
|---|---|---|---|---|
| 2008/0310077 A1* | 12/2008 | Itamura | .................. | H01G 4/228 361/306.3 |
| 2015/0116898 A1* | 4/2015 | Takashima | ............. | H01G 4/012 361/301.4 |
| 2016/0027586 A1* | 1/2016 | Kim | ........................ | H01G 4/30 361/301.4 |
| 2016/0133383 A1* | 5/2016 | Park | ........................ | H01G 4/30 174/260 |

FOREIGN PATENT DOCUMENTS

JP    2002111219 A  *  4/2002
JP    2005-317776 A    11/2005

* cited by examiner

*Primary Examiner* — Eric W Thomas
(74) *Attorney, Agent, or Firm* — Oliff PLC

(57) ABSTRACT

A plurality of dielectric layers containing one of $CaZrO_3$ and $SrZrO_3$ and a plurality of internal electrodes containing Ni are alternately disposed in a second direction. The plurality of internal electrodes includes a plurality of first internal electrodes and a plurality of second internal electrodes. Each of first connecting portions of the first internal electrodes includes a first end portion connected to a first terminal electrode. Each of second connecting portions of the second internal electrodes includes a second end portion connected to a second terminal electrode. The first end portions of the first connecting portions adjacent to each other in the second direction are located not to overlap with each other when viewed from the second direction. The second end portions of the second connecting portions adjacent to each other in the second direction are located not to overlap with each other when viewed from the second direction.

26 Claims, 11 Drawing Sheets

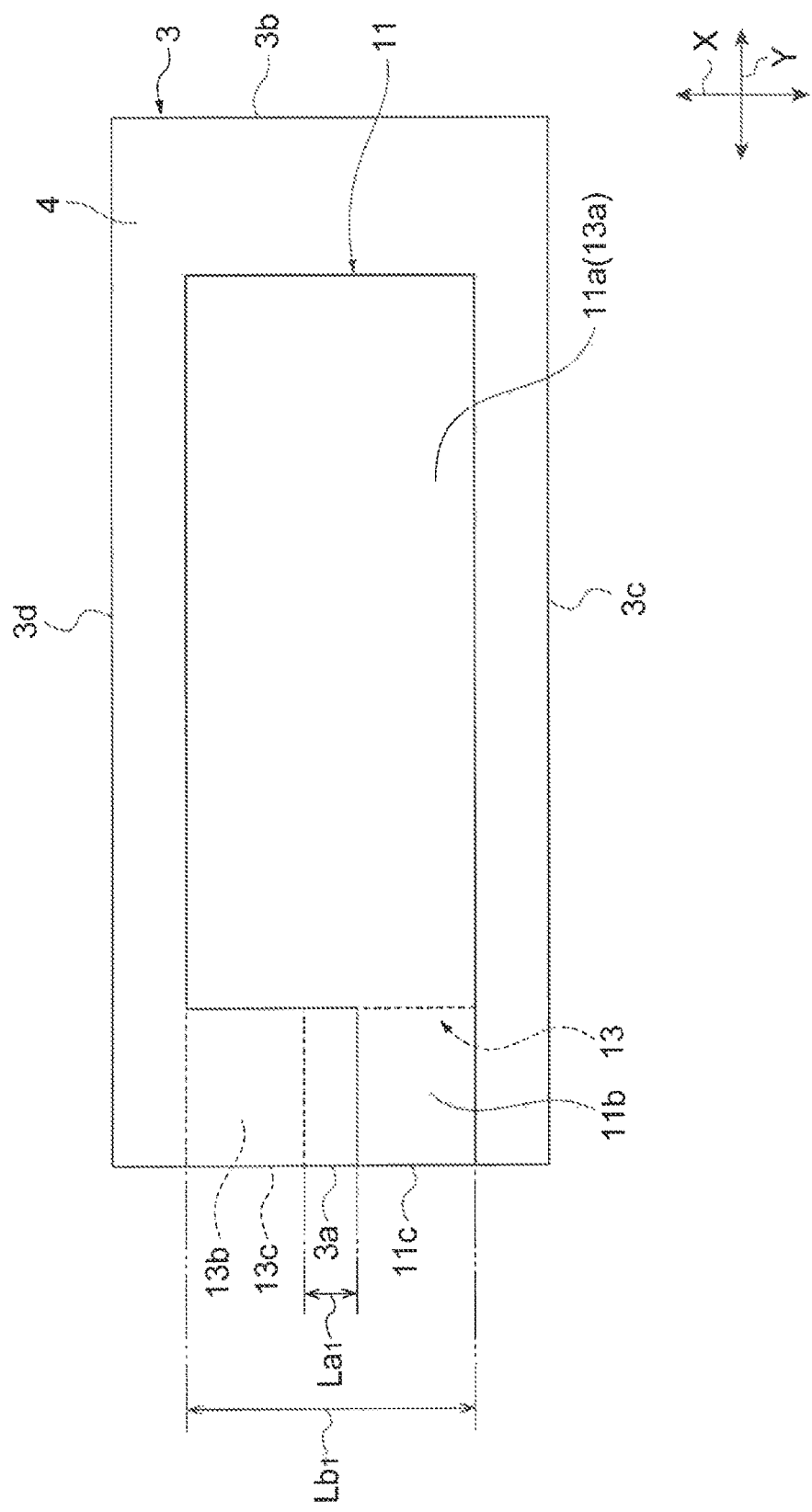

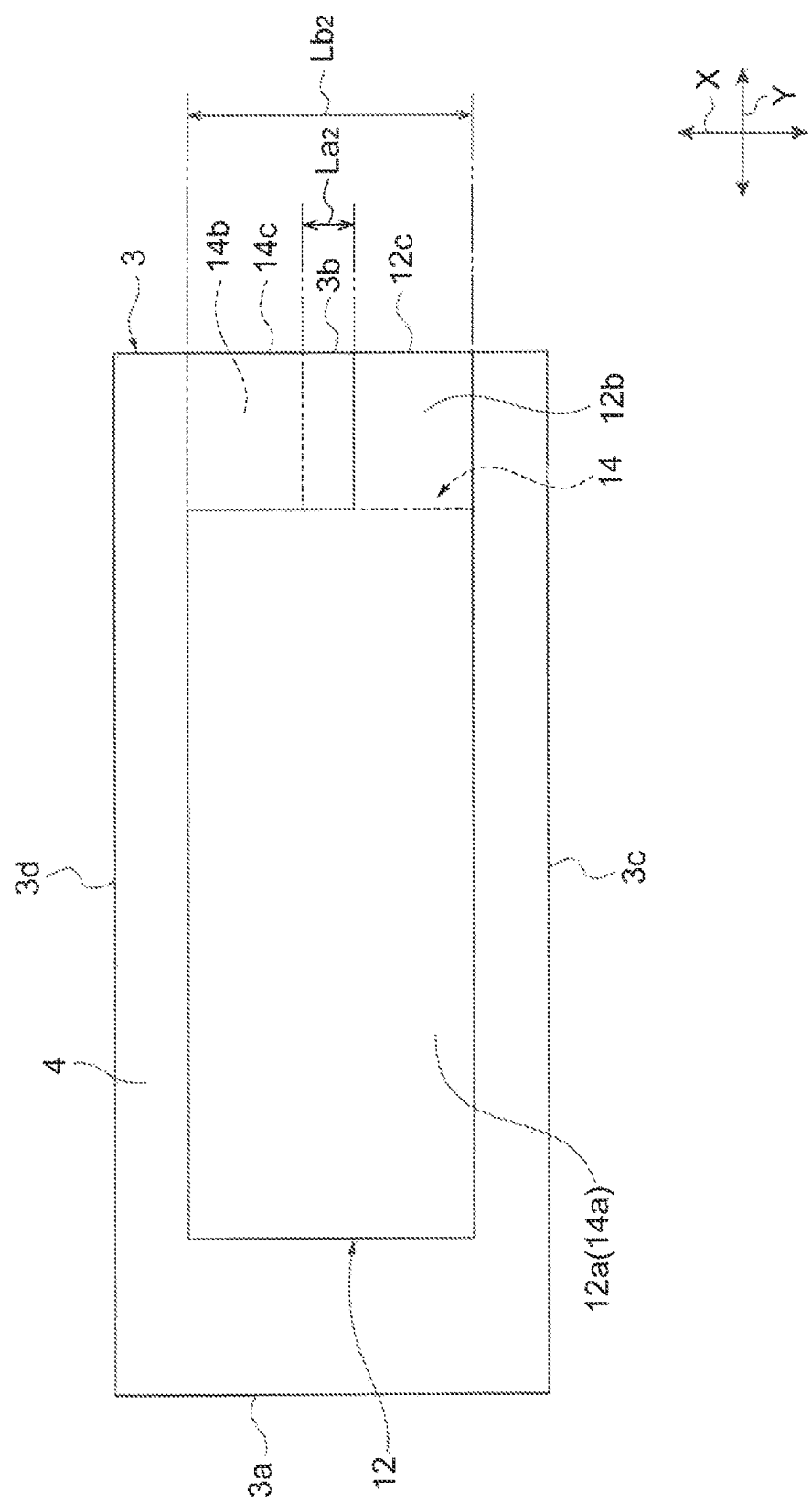

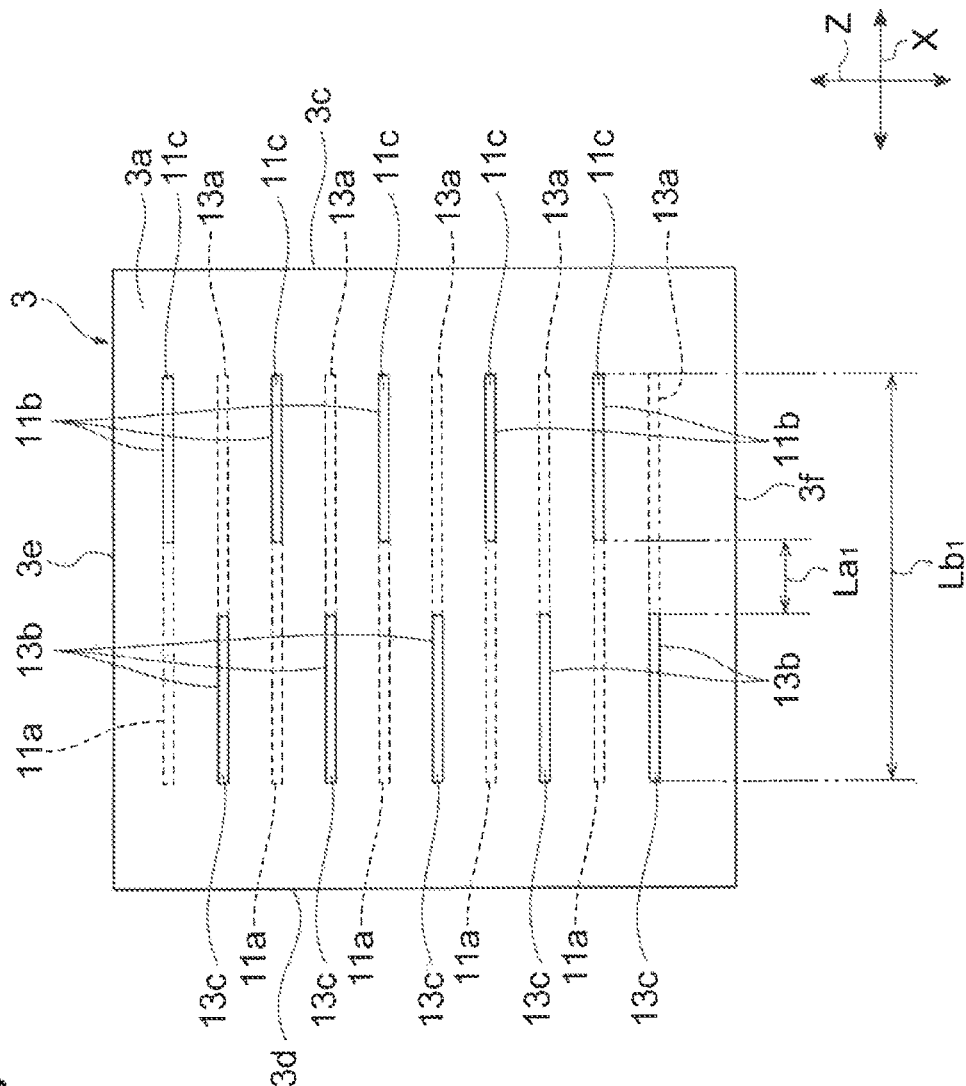

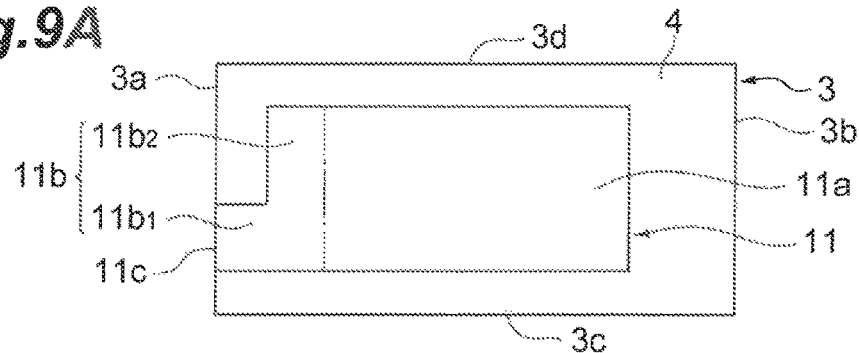
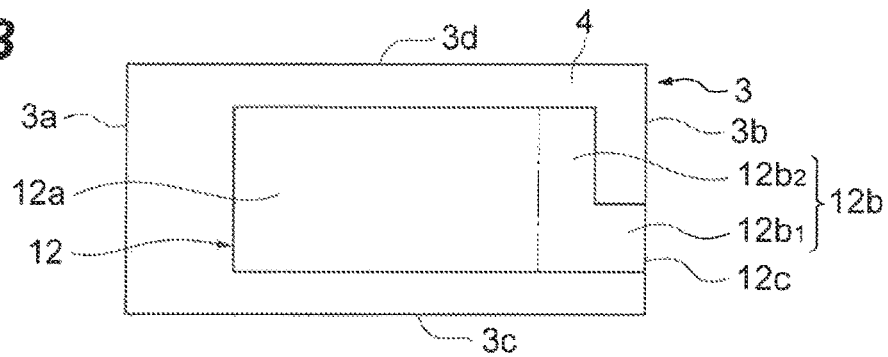
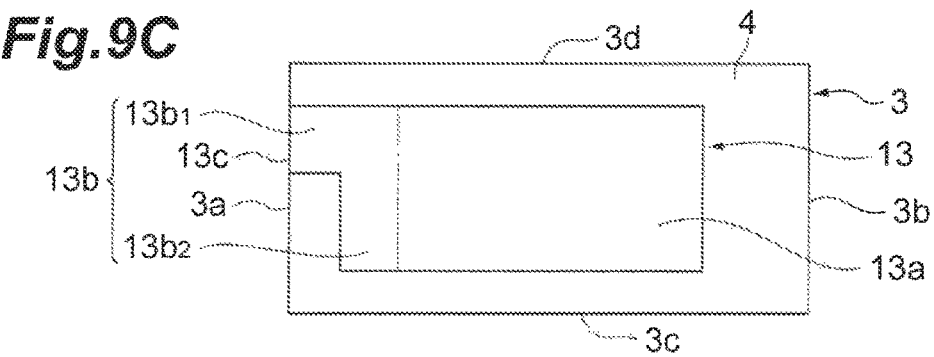
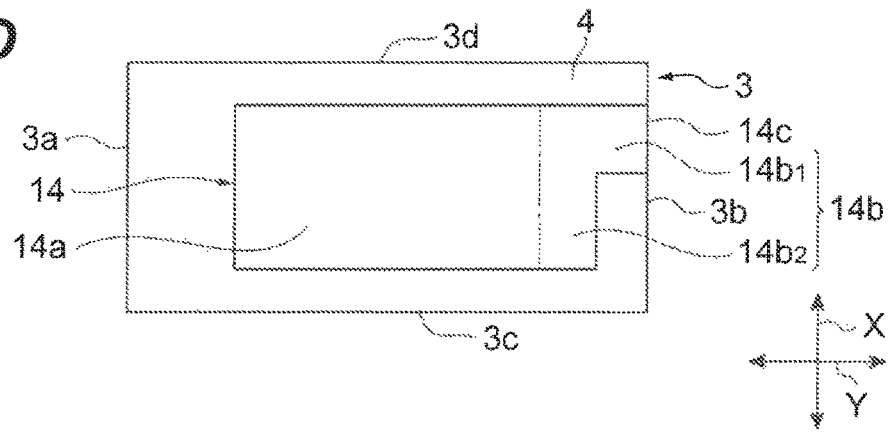

MULTILAYER CERAMIC CAPACITOR

BACKGROUND OF THE INVENTION

1. Field of the Invention

The present invention relates to a multilayer ceramic capacitor.

2. Description of Related Art

Japanese Unexamined Patent Publication No. 2005-317776 discloses a multilayer ceramic capacitor. The multilayer ceramic capacitor includes an element body having a first end surface and a second end surface that oppose each other, a first end terminal electrode disposed on the first end surface, and a second terminal electrode disposed on the second end surface. The element body includes a plurality of dielectric layers containing one of Ca, Sr, and Zr as a main component and a plurality of internal electrodes containing Ni as a main component, being alternately disposed.

The plurality of internal electrodes includes a plurality of first internal electrodes connected with the first terminal electrode and a plurality of second internal electrodes connected with the second terminal electrode. The first internal electrode includes a first main electrode portion and a first connecting portion that connects the first main electrode portion with the first terminal electrode. The second internal electrode includes a second main electrode portion and a second connecting portion that connects the second main electrode portion with the second terminal electrode.

SUMMARY OF THE INVENTION

In the multilayer ceramic capacitor described in the above-described patent publication, residual stresses concentrate on the first connecting portion and the second connecting portion. Concentration of the residual stress is attributed to a difference in contraction between the plurality of internal electrodes and the plurality of dielectric layers during firing. This might lead to a crack that occurs after firing in an interface between the internal electrode and the dielectric layer, starting from the first connecting portion or the second connecting portion.

An object of one aspect of the present invention is to provide a multilayer ceramic capacitor that suppresses occurrence of a crack.

A multilayer ceramic capacitor according to one aspect of the present invention includes an element, body having a first end surface and a second end surface that oppose each other in a first direction, a first terminal electrode disposed on the first end surface of the element body, and a second terminal electrode disposed on the second end surface of the element body. The element body includes a plurality of dielectric layers containing one of $CaZrO_3$ and $SrZrO_3$ as a main component and a plurality of internal electrodes containing Ni as a main component, being alternately disposed in a second direction. The plurality of internal electrodes includes a plurality of first internal electrodes connected with the first terminal electrode and a plurality of second internal electrodes connected with the second terminal electrode. Each of the first internal electrodes includes a first main electrode portion, and a first connecting portion that connects the first main electrode portion with the first terminal electrode and includes a first end portion connected with the first terminal electrode. Each of the second internal electrodes includes a second main electrode portion, and a second connecting portion that connects the second main electrode portion with the second terminal electrode and includes a second end portion connected with the second terminal electrode. The first end portions of the first connecting portions adjacent to each other in the second direction are located not to overlap with each other when viewed from the second direction. The second end portions of the second connecting portions adjacent to each other in the second direction are located not to overlap with each other when viewed from the second direction.

In the multilayer ceramic capacitor according to the one aspect, the first end portions of the first connecting portions adjacent to each other in the second direction are located not to overlap with each other when viewed from the second direction. When the first end surface is viewed, the first end portions are alternately arranged in a plurality of rows. Therefore, in the one aspect, residual stresses that concentrate on the first connecting portions are dispersed, as compared with a configuration where all the first end portions are arranged in a same row. The second end portions of the second connecting portions adjacent to each other in the second direction are located not to overlap with each other when viewed from the second direction. When the second end surface is viewed, the second end portions are alternately arranged in a plurality of rows. Therefore, in the one aspect, residual stresses that concentrate on the second connecting portions are dispersed, as compared with a configuration where all the second end portions are arranged in a same row. In the one aspect, as a result of dispersion of the residual stresses that concentrate on the first connecting portion and the second connecting portion, the occurrence of a crack attributed to the residual stresses is suppressed.

In the multilayer ceramic capacitor according to the one aspect, the first end portions of the first connecting portions adjacent to each other in the second direction may be separated from each other in a third direction orthogonal to the first direction and the second direction, and spacing of the first end portions separated from each other in the third direction may be 0.1 to 0.6 times as great as a width of the first main electrode portion in the third direction. The second end portions of the second connecting portions adjacent to each other in the second direction may be separated from each other in the third direction, and spacing of the second end portions separated from each other in the third direction may be 0.1 to 0.6 times as great as a width of the second main electrode portion in the third direction. In this embodiment, the residual stresses that concentrate on the first connecting portion and the second connecting portion are further dispersed. Therefore, the occurrence of the crack attributed to the residual stresses is further suppressed in the present embodiment.

In the multilayer ceramic capacitor according to the one aspect, a ratio of a thickness of the dielectric layer to a thickness of the internal electrode may be 1.5 or more. In this embodiment, the residual stresses that concentrate on the first connecting portion and the second connecting portion are further dispersed. Therefore, the occurrence of the crack attributed to the residual stresses is further suppressed in this embodiment.

In the multilayer ceramic capacitor according to the one aspect, a surface roughness of the element body may be 3.0 to 6.0 µm. In this embodiment, the residual stresses that concentrate on the first connecting portion and the second connecting portion are further dispersed. Therefore, the occurrence of the crack attributed to the residual stresses is further suppressed in the embodiment.

In the multilayer ceramic capacitor according to the one aspect, the first connecting portion may include a first narrow portion and a first wide portion. In which case, the first narrow portion is connected to the first terminal electrode and has a width narrower than a width of the first main electrode portion. The first wide portion connects the first narrow portion with the first main electrode portion and has a width greater than the width of the first narrow portion. The second connecting portion may include a second narrow portion and a second wide portion. In which case, the second narrow portion is connected with the second terminal electrode and has a width narrower than a width of the second main electrode portion. The second wide portion connects the second narrow portion with the second main electrode portion and has a width greater than the width of the second narrow portion. When viewed from the second direction, the first wide portion may be located between a first region in which the first main electrode portion and the second main electrode portion overlap with each other and a second region in which the first narrow portion is arranged. When viewed in the second direction, the second wide portion may be located between the first region and a third region in which the second narrow portion is arranged.

On the element body, a local level difference may generate between the first region and a region close to the first region when viewed from the second direction. The local level difference is attributed to a thickness of the first main electrode portion and a thickness of the second main electrode portion. The local level difference might be one of factors of a crack.

In the embodiment, the second region and the third region are located close to the first region when viewed from the second direction. Therefore, a level difference generated between the first region and a region close to the first region when viewed from the second direction is gentle, and thus, the level difference is unlikely to be one of the factors of the crack. As a result, the occurrence of a crack caused by the level difference is suppressed in the embodiment In the multilayer ceramic capacitor according to the one aspect, the first main electrode portion may include a third wide portion and a third narrow portion. In which case, the third wide portion has a width greater than a width of the first connecting portion. The third narrow portion connects the third wide portion with the first connecting portion and has a width narrower than the width of the third wide portion. The second main electrode portion may include a fourth wide portion and a fourth narrow portion. In which case, the fourth wide portion has a width greater than a width of the second connecting portion. The fourth narrow portion connects the fourth wide portion with the second connecting portion and has a width narrower than the width of the fourth wide portion. The width of the third narrow portion may be narrower than the width of the fourth wide portion. The width of the fourth narrow portion may be narrower than the width of the third wide portion. When viewed from the second direction, the third narrow portion may overlap with the fourth wide portion. When viewed from the second direction, the fourth narrow portion may overlap with the third wide portion. In this embodiment, the occurrence of a crack caused by the level difference attributed to the thickness of the internal electrode is suppressed.

The third wide portion and the fourth narrow portion are overlapped with each other and the fourth wide portion and the third narrow portion overlap with each other when viewed from the second direction, and thus, there located is a region in which the third wide portions overlap with each other without including the fourth narrow portion therebetween and there located is a region in which the four wide portions overlap with each other without including the third narrow portion therebetween, adjacent to a region in which the third wide portion and the fourth wide portion overlap with each other, when viewed from the second direction. Therefore, a level difference generated between the region in which the third wide portion and the fourth wide portion overlap with each other when viewed from the second direction and a region close to the region when viewed from the second direction is gentle, and thus, the level difference is unlikely to be one of the factors of the crack. As a result, the occurrence of a crack caused by the level difference is suppressed in the embodiment.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5 is a diagram illustrating a state in which the internal electrode illustrated in FIG. 4A and the internal electrode illustrated in FIG. 4C are overlapped with each other;

FIG. 6 is a diagram illustrating a state in which the internal electrode illustrated in FIG. 4B and the internal electrode illustrated in FIG. 4D are overlapped with each other;

FIG. 7 is a plan view illustrating an end surface of an element body;

FIGS. 9A, 9B, 9C, and 9D are plan views each illustrating an internal electrode included in a multilayer ceramic capacitor according to a second embodiment.

DETAILED DESCRIPTION OF EMBODIMENTS

Figure 1:
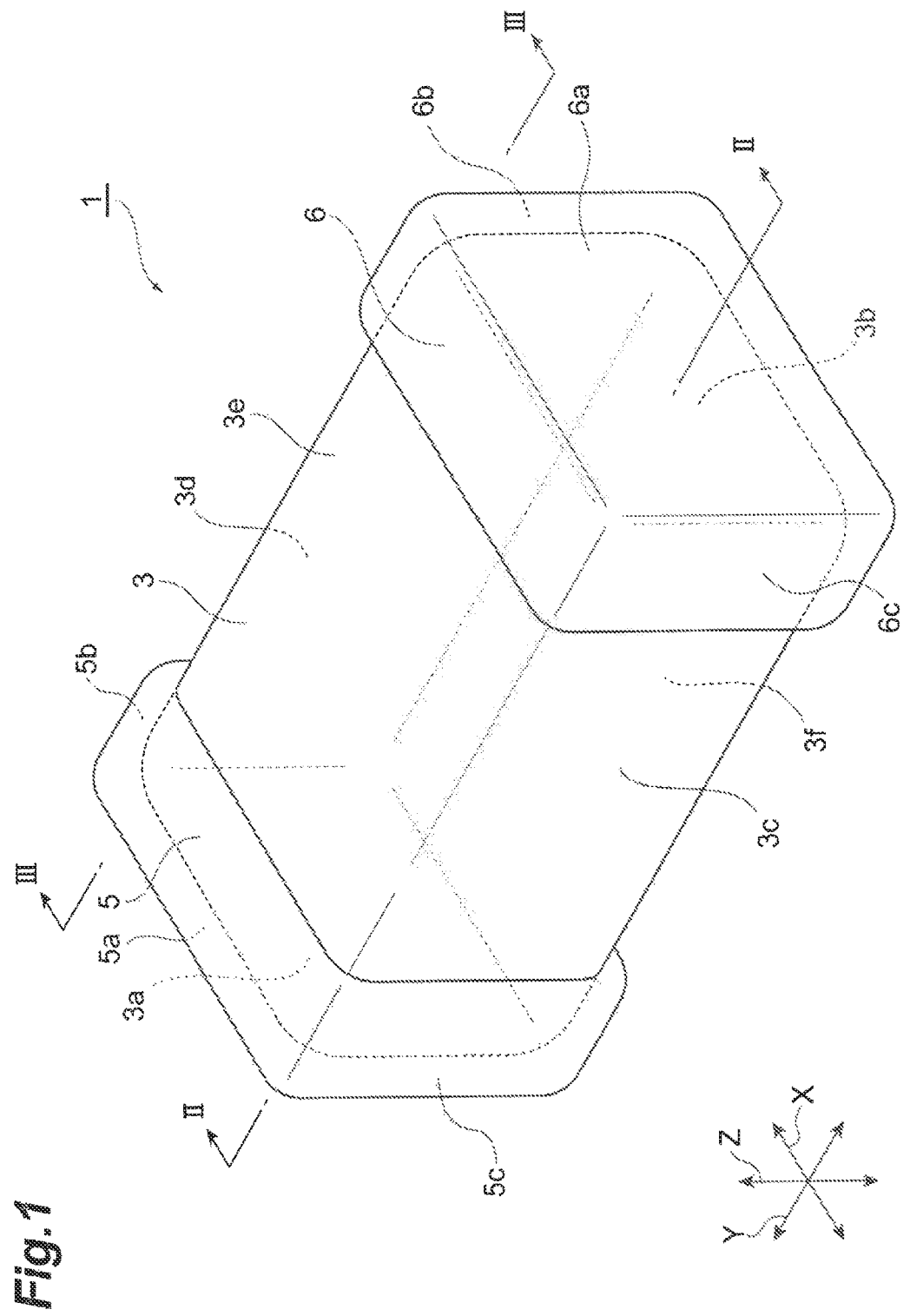
FIG. 1 is a perspective view illustrating a multilayer ceramic capacitor according to a first embodiment.

Embodiments of the present invention will be described in detail with reference to the accompanying drawings. In the description, same reference numerals will be used for same elements or elements having a same function, and redundant explanations will be omitted.

First Embodiment

Figure 2:
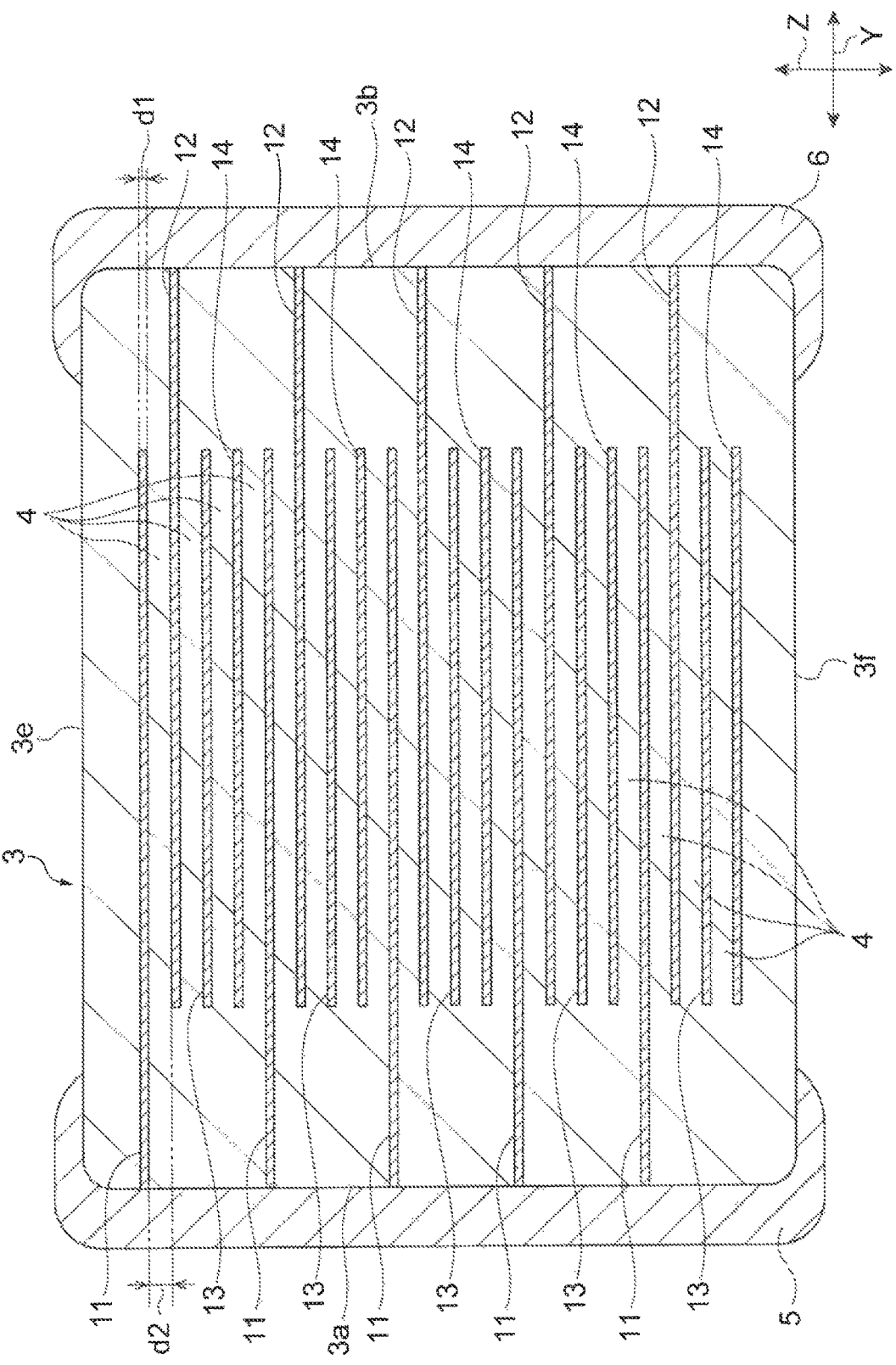
FIG. 2 is a cross-sectional view taken along line II-II illustrated in FIG. 1.
Figure 3:
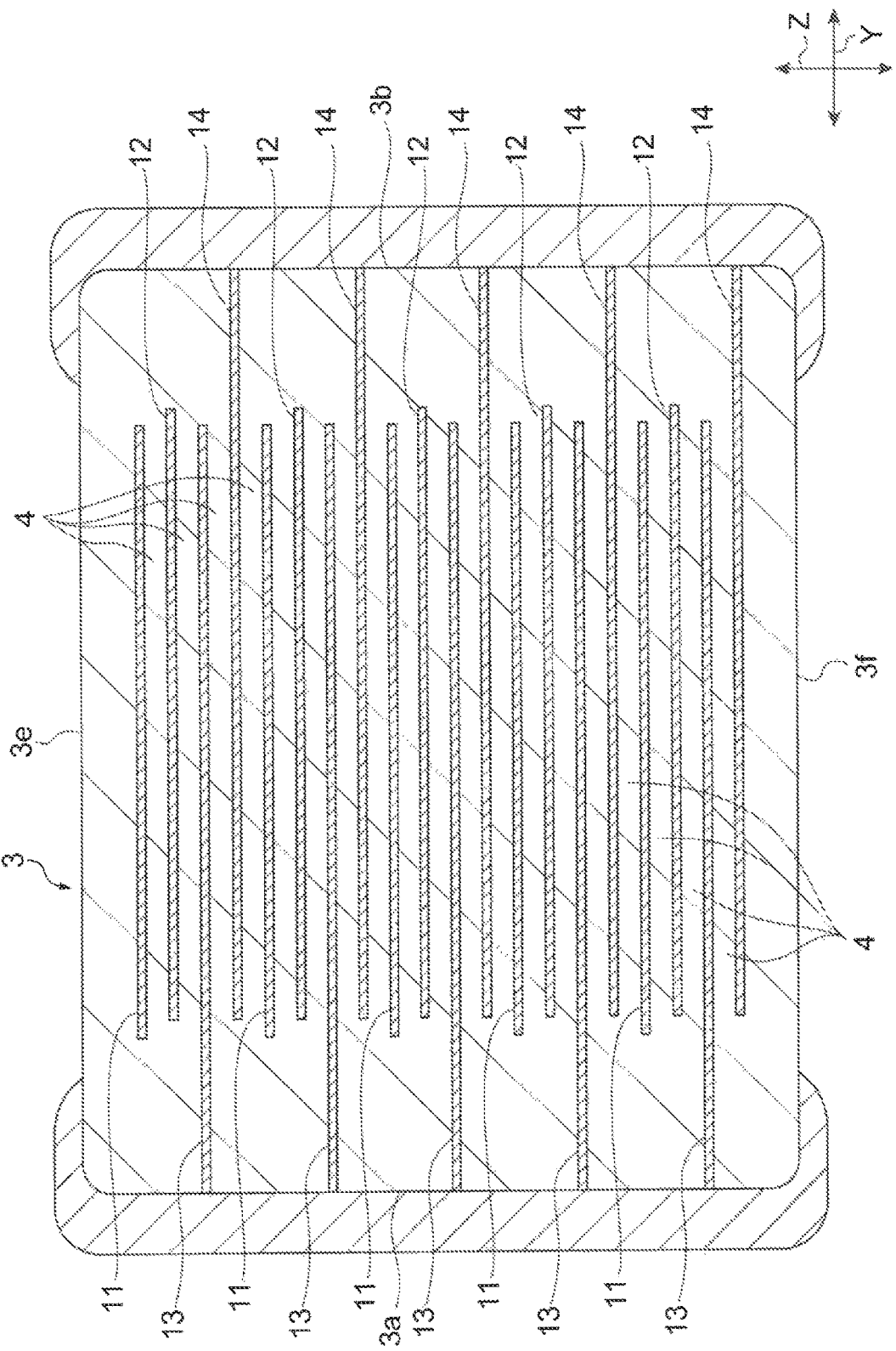
FIG. 3 is a cross-sectional view taken along line III-III illustrated in FIG. 1.

First, a multilayer ceramic capacitor 1 according to a first embodiment will be described with reference to FIGS. 1 to 3 and FIGS. 4A to 4D. FIG. 1 is a perspective view illustrating the multilayer ceramic capacitor according to the first embodiment. FIG. 2 is a cross-sectional view taken along line II-II illustrated in FIG. 1. FIG. 3 is a cross-sectional view taken along line illustrated in FIG. 1. FIGS. 4A to 4D are plan views each illustrating an internal electrode.

As illustrated in FIGS. 1 to 3, the multilayer ceramic capacitor 1 includes an element body 3 and a pair of terminal electrodes 5 and 6 disposed on the element body 3.

The element body 3 has a rectangular parallelepiped shape. The rectangular parallelepiped shape includes a rectangular parallelepiped shape having a chamfered corner portion and a chamfered ridge portion, and includes a rectangular parallelepiped shape with a rounded corner portion and a rounded ridge portion. The element body 3 includes a pair of end surfaces 3a and 3b opposing each other in a Y direction, a pair of principal surfaces 3e and 3f opposing each other in a Z direction, and a pair of side surfaces 3c and 3d opposing each other in an X direction. The X direction, the Y direction, and the Z direction are orthogonal to each other. Each of the end surface 3a and 3b extends in the Z direction and the X direction, respectively, to connect the principal surface 3e with the principal surface 3f. Each of the principal surfaces 3e and 3f extends in the X direction and the Y direction, respectively. The side surfaces 3c and 3d extend in the Y direction and the Z direction, respectively, to connect the principal surface 3e with the principal surface 3f.

Surface roughness of the element body 3 is 3.0 to 6.0 μm, for example. The surface roughness is controlled by changing barrel polishing conditions. The barrel polishing conditions vary by changing abrasive to be used, for example. The surface roughness is a maximum height (Rz), for example. The maximum height (Rz) is defined in JIS B 0601: 2001 (ISO 4287: 1997).

Figure 11:
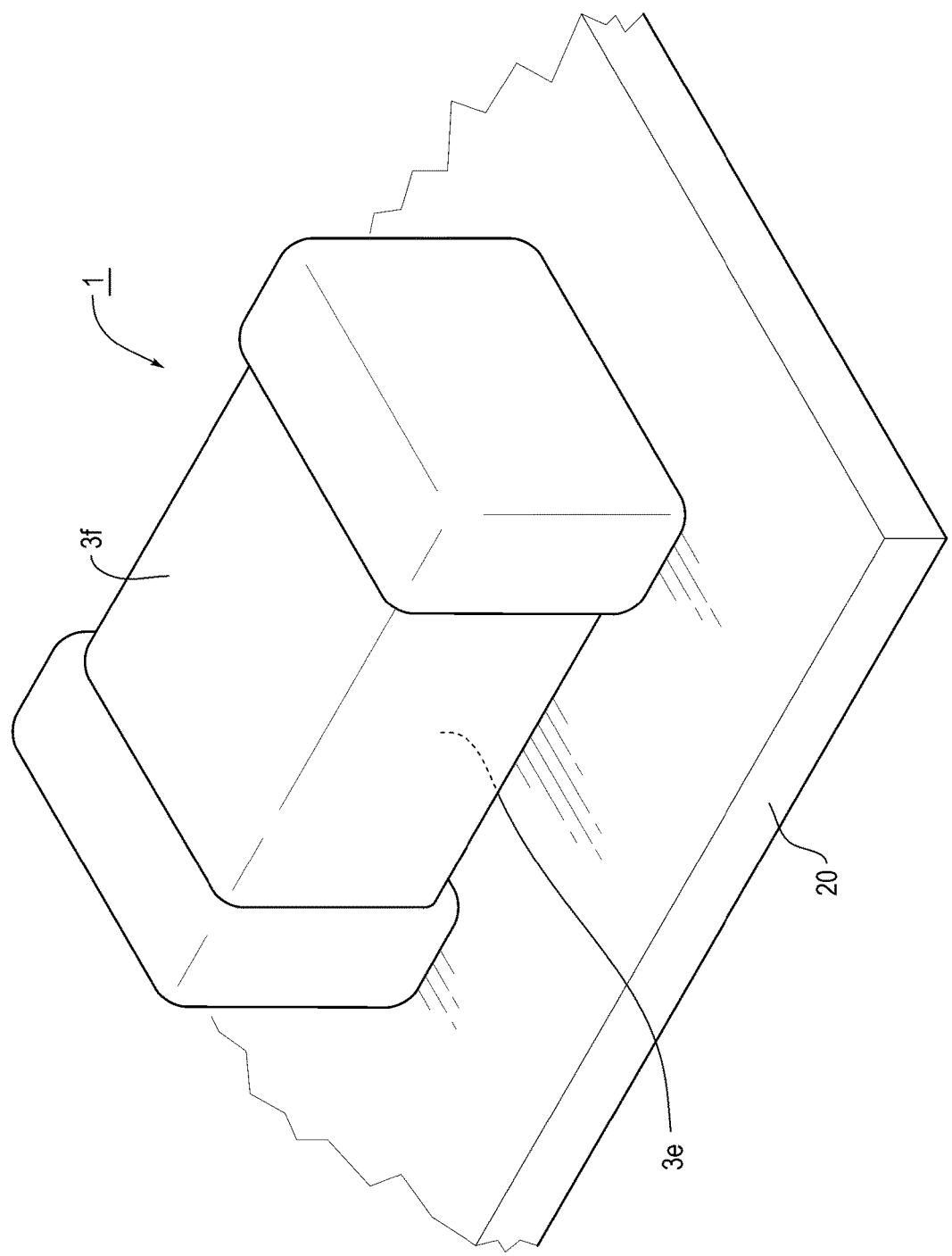
FIG. 11 is a perspective view illustrating the multilayer ceramic capacitor of FIG. 1 mounted on an electric device.

For example, when the multilayer ceramic capacitor 1 is mounted on another electronic device such as a circuit board or an electronic component, one of the principal surface 3f and the principal surface 3e is a mounting surface facing the other electronic device. For example, as illustrated in FIG. 11, the multilayer ceramic capacitor 1 is soldered with the principal surface 3e facing the electronic device 20.

The element body 3 is configured by stacking a plurality of dielectric layers 4 and a plurality of internal electrodes 11, 12, 13, and 14 in the Z direction. That is, the element body 3 includes the plurality of dielectric layers 4 and the plurality of internal electrodes 11, 12, 13, and 14 stacked in the Z direction. The plurality of dielectric layers 4 and the plurality of internal electrodes 11 to 14 are alternately disposed. A stacking direction of the plurality of dielectric layers 4 and the plurality of internal electrodes 11 to 14 corresponds to the Z direction, that is, the direction in which the principal surface 3e opposes the principal surface 3f. The stacking direction of the plurality of dielectric layers 4 and the plurality of internal electrodes 11 to 14 is the Z direction.

A ratio (d2/d1) of a thickness d2 of each of the dielectric layers 4 to a thickness d1 of each of the internal electrodes 11 to 14 is 1.5 or more, for example. The thickness d1 is the length of each of the internal electrodes 11 to 14 in the Z direction. The thickness d2 is the length of each of the dielectric layers 4 in the Z direction. The more the thickness d2 is, the smaller the capacitance is. Therefore, the thickness d2 is 1.5 to 20.0 μm, for example. The smaller the thickness d1 is, the greater the equivalent series resistance (ESR) is. Therefore, the thickness d1 is 0.5 to 3.0 μm, for example.

The main component of each of the plurality of dielectric layers 4 is one of $CaZrO_3$ and $SrZrO_3$. The main component indicates a component occupying 90% by weight or more in the entire component. The dielectric layer 4 may be made of one of $CaZrO_3$ and $SrZrO_3$, for example. The dielectric layer 4 may contain an unavoidable impurity, for example. The one of $CaZrO_3$ and $SrZrO_3$ is a paraelectric material. The plurality of dielectric layers 4 includes a sintered body of a ceramic green sheet containing the above-described paraelectric material. In the actual element body 3, the plurality of dielectric layers 4 is integrated with each other to such a degree that a boundary between each of the dielectric layers 4 can hardly be visually recognized.

The terminal electrode 5 is disposed on the end surface 3a. The terminal electrode 5 is formed to cover each of portions on the principal surface 3e, the principal surface 3f, the side surface 3c, and the side surface 3d, close to the end surface 3a, and to cover the end surface 3a. The terminal electrode 5 includes an electrode portion 5a located on the entire surface of the end surface 3a, an electrode portion located in the portion on the principal surface 3e close to the end surface 3a, an electrode portion located in the portion on the principal surface 3f close to the end surface 3a, an electrode portion 5c located in the portion on the side surface 3c close to the end surface 3a, and an electrode portion 5b located in the portion on the side surface 3d close to the end surface 3a.

The terminal electrode 6 is disposed on the end surface 3b. The terminal electrode 6 is formed to cover each of portions on the principal surface 3e, the principal surface 3f, the side surface 3c, and the side surface 3d, close to the end surface 3b, and to cover the end surface 3b. The terminal electrode 6 includes an electrode portion 6a located on the entire surface of the end surface 3b, an electrode portion located in the portion on the principal surface 3e close to the end surface 3b, an electrode portion located in the portion on the principal surface 3f close to the end surface 3b, an electrode portion 6c located in the portion on the side surface 3c close to the end surface 3b, and an electrode portion 6b located in the portion on the side surface 3d close to the end surface 3b.

Each of the terminal electrodes 5 and 6 includes a sintered layer and a plating layer. The sintered layer is formed by sintering a conductive paste applied to an outer surface of the element body 3, for example. The conductive paste includes a conductive metal powder and a glass frit, for example. The conductive metal for the sintered layer includes Cu and Ni, for example. The sintered layer is a sintered metal layer. The plating layer is formed on the sintered layer by a plating method. The plating layer is made of Ni, Cu, Sn, or Au, for example. The plating layer may contain a plurality of layers. In which case, the plating layer, that is, an outermost layer, is made of Au or Sn, for example. The terminal electrode 5 and the terminal electrode 6 are separated from each other and are electrically insulated from each other on the outer surface of the element body 3. The terminal electrode 5 and the terminal electrode 6 have mutually different polarities.

The main component of each of the plurality of internal electrodes 11 to 14 is Ni. This main component indicates a component occupying 90% by weight or more in the entire component. The internal electrodes 11 to 14 may be made of Ni, for example. The internal electrodes 11 to 14 may contain an unavoidable impurity, for example. Ni is a conductive material. The plurality of internal electrodes 11 to 14 is configured as a sintered body of a conductive paste containing Ni. The plurality of internal electrodes 11 to 14 includes the plurality of internal electrodes 11 and 13 each connected with the terminal electrode 5, and includes the plurality of internal electrodes 12 and 14 each connected with the terminal electrode 6. In the present embodiment, the number of each of the internal electrodes 11 to 14 is "five". In the Z direction, the internal electrodes 11 to 14 are arranged with the dielectric layer 4 therebetween, in the order of the internal electrode 11, the internal electrode 12, the internal electrode 13, and the internal electrode 14.

Figure 4A:
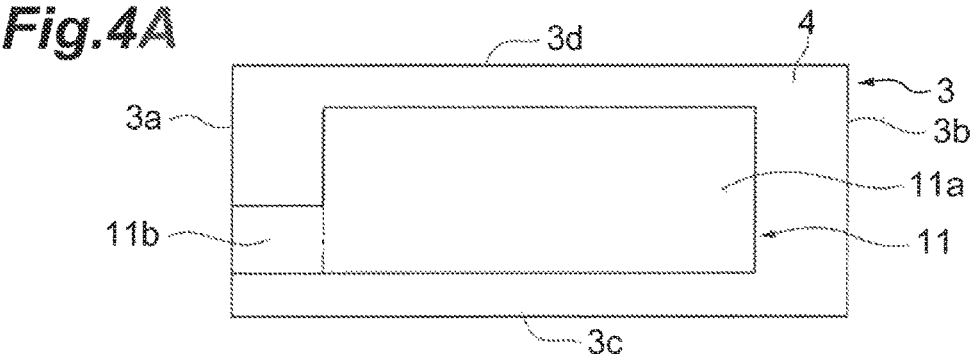
FIGS. 4A, 4B, 4C, and 4D are plan views each illustrating an internal electrode.

FIG. 4A illustrates the internal electrode 11. As illustrated in FIG. 4A, the internal electrode 11 includes a main electrode portion 11a and a connecting portion 11b. The main electrode portion 11a and the connecting portion 11b are integrally formed. In FIG. 4A, a boundary between the main electrode portion 11a and the connecting portion 11b is indicated by a one-dot chain line. The main electrode portion 11a has a rectangular shape having a short-side in the X direction and a long-side in the Y direction, for example.

The connecting portion 11b is exposed at the end surface 3a. The connecting portion 11b extends between the main electrode portion 11a and the end surface 3a. The connecting portion 11b is connected with the terminal electrode 5 at the end surface 3a. The connecting portion 11b is located between the main electrode portion 11a and the terminal electrode 5 and connects the main electrode portion 11a with the terminal electrode 5. The connecting portion 11b electrically connects the main electrode portion 11a with the terminal electrode 5. The connecting portion 11b has a rectangular shape having a short-side in the X direction and a long-side in the Y direction, for example. The length of the short-side of the connecting portion 11b is shorter than the length of the short-side of the main electrode portion 11a. In the X direction, the connecting portion 11b is narrower than the main electrode portion 11a.

Figure 4B:
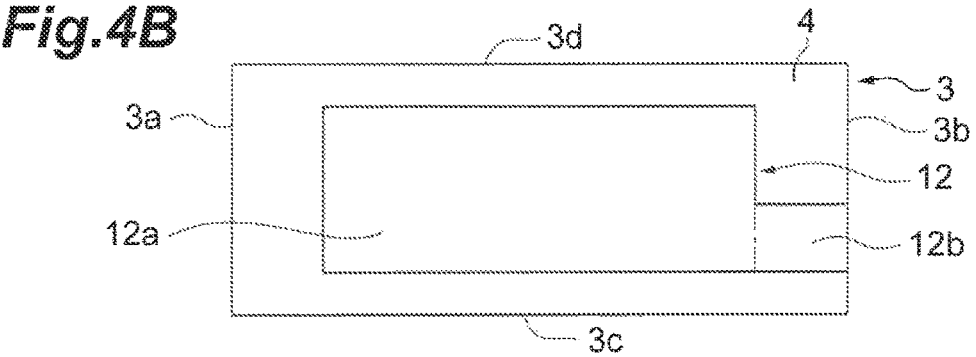

FIG. 4B illustrates the internal electrode 12. As illustrated in FIG. 4A, the internal electrode 12 includes a main electrode portion 12a and a connecting portion 12b. The main electrode portion 12a and the connecting portion 12b are integrally formed. In FIG. 4B, a boundary between the main electrode portion 12a and the connecting portion 12b is indicated by a one-dot chain line. The main electrode portion 12a has a rectangular shape having a short-side in the X direction and a long-side in the Y direction, for example.

The connecting portion 12b is exposed at the end surface 3b. The connecting portion 12b extends between the main electrode portion 12a and the end surface 3b. The connecting portion 12b is connected with the terminal electrode 6 at the end surface 3b. The connecting portion 12b is located between the main electrode portion 12a and the terminal electrode 6 and connects the main electrode portion 12a with the terminal electrode 6. The connecting portion 12b electrically connects the main electrode portion 12a with the terminal electrode 6. The connecting portion 12b has a rectangular shape having a short-side in the X direction and a long-side in the Y direction, for example. The length of the short-side of the connecting portion 12b is shorter than the length of the short-side of the main electrode portion 12a. In the X direction, the connecting portion 12b is narrower than the main electrode portion 12a.

Figure 4C:
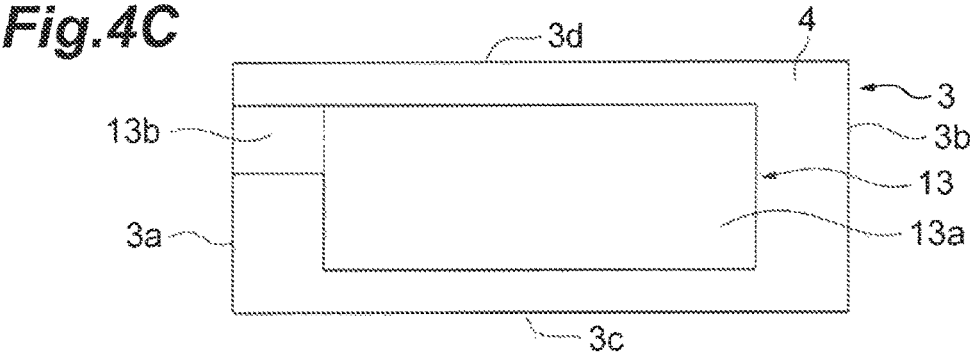

FIG. 4C illustrates the internal electrode 13. As illustrated in FIG. 4C, the internal electrode 13 includes a main electrode portion 13a and a connecting portion 13b. The main electrode portion 13a and the connecting portion 13b are integrally formed. In FIG. 4C, a boundary between the main electrode portion 13a and the connecting portion 13b is indicated by a one-dot chain line. The main electrode portion 13a has a rectangular shape having a short-side in the X direction and a long-side in the Y direction, for example.

The connecting portion 13b is exposed at the end surface 3a. The connecting portion 13b extends between the main electrode portion 13a and the end surface 3a. The connecting portion 13b is connected with the terminal electrode 5 at the end surface 3a. The connecting portion 13b is located between the main electrode portion 13a and the terminal electrode 5 and connects the main electrode portion 13a with the terminal electrode 5. The connecting portion 13b electrically connects the main electrode portion 13a with the terminal electrode 5. The connecting portion 13b has a rectangular shape having a short-side in the X direction and a long-side in the Y direction, for example. The length of the short-side of the connecting portion 13b is shorter than the length of the short-side of the main electrode portion 13a. In the X direction, the connecting portion 13b is narrower than the main electrode portion 13a.

Figure 4D:
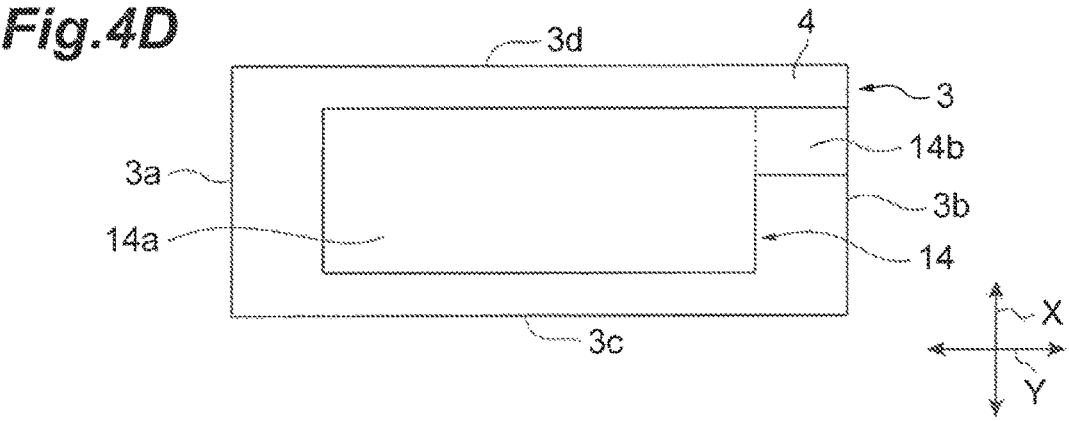

FIG. 4D illustrates the internal electrode 14. As illustrated in FIG. 4D, the internal electrode 14 includes a main electrode portion 14a and a connecting portion 14b. The main electrode portion 14a and the connecting portion 14b are integrally formed. In FIG. 4D, a boundary between the main electrode portion 14a and the connecting portion 14b is indicated by a one-dot chain line. The main electrode portion 14a has a rectangular shape having a short-side in the X direction and a long-side in the Y direction, for example.

The connecting portion 14b is exposed at the end surface 3b. The connecting portion 14b extends between the main electrode portion 14a and the end surface 3b. The connecting portion 14b is connected with the terminal electrode 6 at the end surface 3b. The connecting portion 14b is located between the main electrode portion 14a and the terminal electrode 6 and connects the main electrode portion 14a with the terminal electrode 6. The connecting portion 14b electrically connects the main electrode portion 14a with the terminal electrode 6. The connecting portion 14b has a rectangular shape having a short-side in the X direction and a long-side in the Y direction, for example. The length of the short-side of the connecting portion 14b is shorter than the length of the short-side of the main electrode portion 14a. In the X direction, the connecting portion 14b is narrower than the main electrode portion 14a.

As illustrated in FIGS. 4A to 4D, the main electrode portions 11a to 14a have substantially a same size and overlap with each other, when viewed from the Z direction. The main electrode portions 11a to 14a adjacent to each other in the Z direction oppose each other with the dielectric layer 4 therebetween (refer to FIGS. 2 and 3). A capacitance component is formed in each of a region in which the main electrode portion 11a and the main electrode portion 12a oppose each other, a region in which the main electrode portion 12a and the main electrode portion 13a oppose each other, a region in which the main electrode portion 13a and the main electrode portion 14a oppose each other, and a region in which the main electrode portion 14a and the main electrode portion 11a oppose each other.

Figure 8:
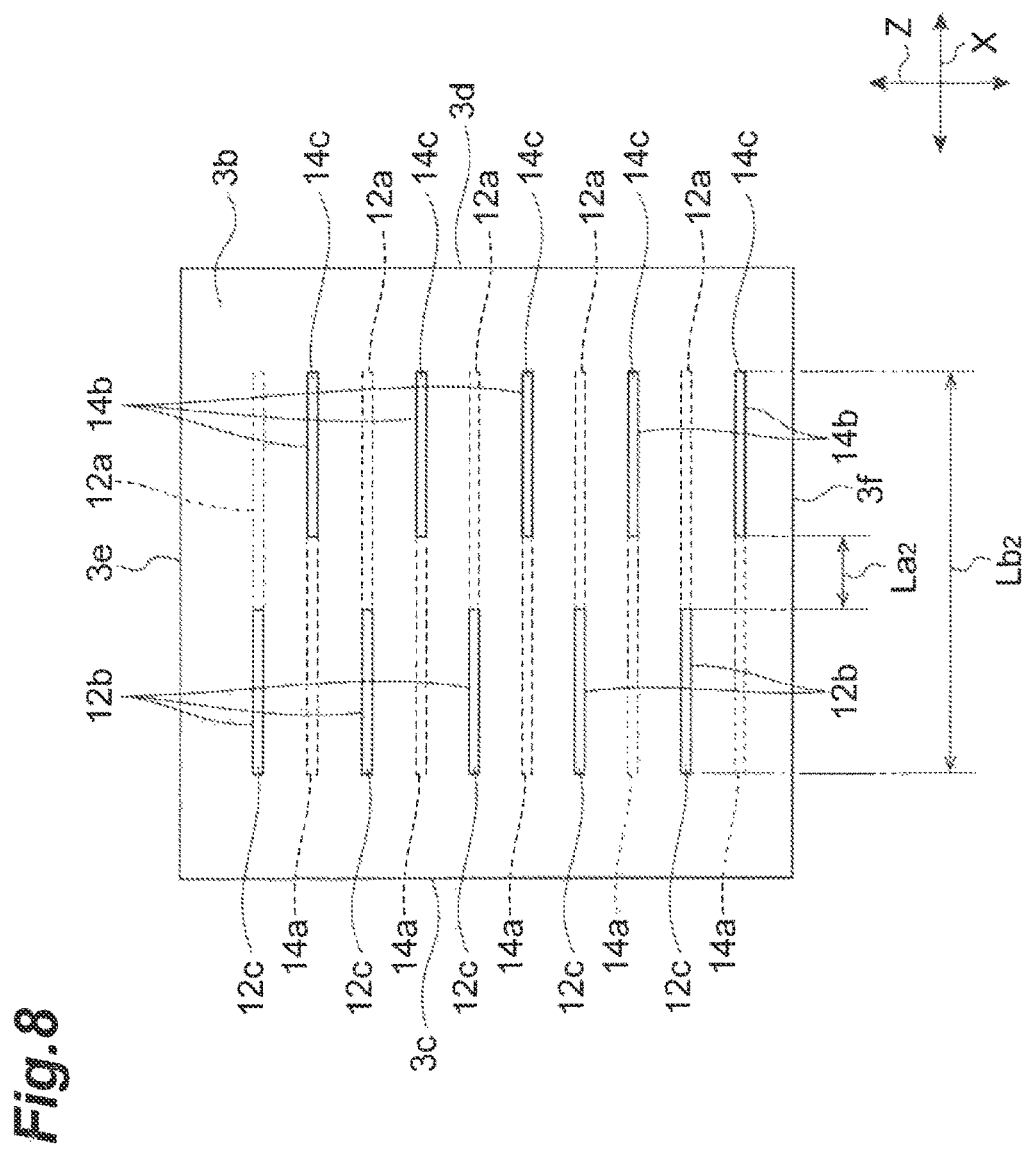
FIG. 8 is a plan view illustrating an end surface of an element body.

Hereinafter, how the internal electrode 11 and the internal electrode 13 overlaps with each other when viewed from the Z direction and how the internal electrode 12 and the internal electrode 14 overlap with each other when viewed from the Z direction will be described in detail with reference to FIGS. 5 to 8. FIG. 5 is a diagram illustrating a state in which the internal electrode 11 and the internal electrode 13 overlap with each other. FIG. 6 is a diagram illustrating a state in which the internal electrode 12 and the internal electrode 14 overlap with each other. FIG. 7 is a plan view illustrating the end surface 3a of the element body 3. FIG. 8 is a plan view illustrating the end surface 3b of the element body 3.

As illustrated in FIG. 5, the position of the formation region of the main electrode portion 11a and the position of the formation region of the main electrode portion 13a are generally aligned with each other when viewed from the Z direction. Substantially the whole of the main electrode portion 11a overlaps with substantially the whole of the main electrode portion 13a when viewed from the Z direction. When viewed from the Z direction, the position of the formation region of the connecting portion 11b is generally different from the position of the formation region of the connecting portion 13b. The connecting portion 11b does not overlap with the connecting portion 13b when viewed from the Z direction.

When viewed from the Z direction, the connecting portion 11b is located closer to the side surface 3c and the connecting portion 13b is located closer to the side surface 3d, between the end surface 3a on which the terminal electrode 5 is disposed and the main electrode portion 11a. The connecting portion 11b includes an end portion 11c connected with the terminal electrode 5. The connecting portion 13b includes an end portion 13c connected with the terminal electrode 5. The end portion 11c and the end portion 13c are exposed at the end surface 3a. The end portion 11c and the end portion 13c are located not to overlap with each other when viewed from the Z direction. That is, the connecting portions 11b and 13b adjacent to each other in the Z direction are located in such a manner that the end portions 11c and 13c do not overlap with each other when viewed from the Z direction.

As illustrated in FIG. 7, when the end surface 3a is viewed, each of the end portions 11c is arranged in the Z direction at a position closer to the side surface 3c in the X direction, and each of the end portions 13c is arranged in the Z direction at a position closer to the side surface 3d in the X direction. The end portion 11c and the end portion 13c are located at different positions in the Z direction. The end portion 11c and the end portion 13c are alternately arranged in two rows and are separated from each other in the X direction.

As illustrated in FIGS. 5 and 7, a separation distance $La_1$ between the end portion 11c and the end portion 13c in the X direction is smaller than a width $Lb_1$ of each of the main electrode portions 11a and 13a in the X direction. The separation distance $La_1$ is spacing between the end portion 11c and the end portion 13c in the X direction. The width $Lb_1$ is the length of a short-side of each of the main electrode portions 11a and 13a. For example, the separation distance $La_1$ is 0.1 to 0.6 times as great as the width $Lb_1$.

As illustrated in FIG. 6, the position of the formation region of the main electrode portion 12a and the position of the formation region of the main electrode portion 14a are generally aligned with each other when viewed from the Z direction. Substantially the whole of the main electrode portion 12a overlaps with substantially the whole of the main electrode portion 14a when viewed from the Z direction. When viewed from the Z direction, the position of the formation region of the connecting portion 12b is generally different from the position of the formation region of the connecting portion 14b. The connecting portion 12b does not overlap with the connecting portion 14b when viewed from the Z direction.

When viewed from the Z direction, the connecting portion 12b is located closer to the side surface 3c and the connecting portion 14b is located closer to the side surface 3d, between the end surface 3b on which the terminal electrode 6 is disposed and the main electrode portion 12a. The connecting portion 12b includes an end portion 12c connected with the terminal electrode 6. The connecting portion 14b includes an end portion 14c connected with the terminal electrode 6. The end portion 12c and the end portion 14c are exposed at the end surface 3b. The end portion 12c and the end portion 14c are located not to overlap with each other when viewed from the Z direction. That is, the connecting portions 12b and 14b adjacent to each other in the Z direction are located in such a manner that the end portions 12c and the end portions 14c do not overlap with each other when viewed from the Z direction.

As illustrated in FIG. 8, when the end surface 3b is viewed, each of the end portions 12c is arranged in the Z direction at a position closer to the side surface 3c in the X direction, and each of the end portions 14c is arranged in the Z direction at a position closer to the side surface 3d in the X direction. The end portion 12c and the end portion 14c are located at different positions in the Z direction. The end portion 12c and the end portion 14c are alternately arranged in two rows and are separated from each other in the X direction.

As illustrated in FIGS. 6 and 8, a separation distance $La_2$ in the X direction between the end portion 12c and the end portion 14c is smaller than a width $Lb_2$ in the X direction of each of the main electrode portions 12a and 14a. The separation distance $La_2$ is spacing between the end portion 12c and the end portion 14c in the X direction. The width $Lb_2$ is the length of a short-side of each of the main electrode portions 12a and 14a. For example, the separation distance $La_2$ is 0.1 to 0.6 times as great as the width $Lb_2$. In the first embodiment, the separation distance $La_1$ is equal to the separation distance $La_2$, and the width $Lb_1$ is equal to the width $Lb_2$. The separation distance $La_1$ and the separation distance $La_2$ may be different from each other. The width $Lb_1$ and the width $Lb_2$ may be different from each other.

As described above, when the end surface 3a is viewed, the end portions 11c and 13c are alternately arranged in a plurality of rows in the first embodiment. Therefore, in the multilayer ceramic capacitor 1, residual stresses that concentrate on the connecting portions 11b and 13b are dispersed, as compared with a configuration where the end portions 11c and 13c are arranged in a same row. When the end surface 3b is viewed, the end portions 12c and 14c are alternately arranged in a plurality of rows. Therefore, in the multilayer ceramic capacitor 1, residual stresses that concentrate on the connecting portions 12b and 14b are dispersed, as compared with a configuration where the end portions 12c and 14c are arranged in a same row. As a result of dispersion of the residual stresses that concentrate on the connecting portions 11b to 14b, the occurrence of a crack attributed to the residual stresses is suppressed in the multilayer ceramic capacitor 1.

In the first embodiment, the separation distance $La_1$ is 0.1 to 0.6 times as great as the width $Lb_1$, and the separation distance $La_2$ is 0.1 to 0.6 times as great as the width $Lb_2$. Therefore, the residual stresses that concentrate on the connecting portions 11b to 14b are further dispersed. As a result, the occurrence of the crack attributed to the residual stresses is further suppressed in the multilayer ceramic capacitor 1.

In the first embodiment, the ratio (d2/d1) of the thickness d2 to the thickness d1 is 1.5 or more. Therefore, the residual stresses that concentrate on the connecting portions 11b to 14b are further dispersed. As a result, the occurrence of the crack attributed to the residual stresses is further suppressed in the multilayer ceramic capacitor 1.

In the first embodiment, the surface roughness of the element body 3 is 3.0 to 6.0 μm. Therefore, the residual stresses that concentrate on the connecting portions 11b to 14b are further dispersed. As a result, the occurrence of the crack attributed to the residual stresses is further suppressed in the multilayer ceramic capacitor 1.

The present inventors conducted a test in order to confirm an effect of suppressing the occurrence of the crack. Hereinafter, the test conducted by the present inventors will be described as examples. In the test, the crack occurrence rate in the element body 3 included in the multilayer ceramic capacitor 1 was measured. The crack occurrence rate was measured by the following procedure. First, 200 element bodies 3 without the terminal electrodes 5 and 6 were prepared for each of examples, and a pressure cooker test was performed on each of the prepared element bodies 3. Specifically, the element body 3 was left for 300 hours under an environment in which the temperature was 121° C. and the humidity was 95% RH. The appearance of the outer surface of the element body 3 after the pressure cooker test was confirmed by a microscope and the number of element bodies 3 having a crack was counted. The crack occurrence rate is a value representing "the number of element bodies 3 having a crack/200" expressed as a percentage. The present invention is not limited to the following examples.

In Examples 1 to 9, t ratio ($La_1/Lb_1$) of the separation distance $La_1$ to the width $Lb_1$ and a ratio ($La_2/Lb_2$) of the separation distance $La_2$ to the width $Lb_2$ are different from each other within a range of 0.05 to 0.8. The measurement results in Examples 1 to 9 are illustrated in Table 1.

TABLE 1

| EXAMPLE | $La_1/Lb_1$, $La_2/Lb_2$ | CRACK OCCURRENCE RATE (%) |
|---|---|---|
| 1 | 0.05 | 23 |
| 2 | 0.1 | 15 |
| 3 | 0.2 | 12 |
| 4 | 0.3 | 10 |
| 5 | 0.4 | 11 |
| 6 | 0.5 | 12 |
| 7 | 0.6 | 14 |
| 8 | 0.7 | 21 |
| 9 | 0.8 | 25 |

As illustrated in Table 1, the crack occurrence rate was 25% or less, indicating that the occurrence of the crack is suppressed, in any case of Examples 1 to 9. In the case of Examples 2 to 7, that is, when each of the ratio ($La_1/Lb_1$) and the ratio ($La_2/Lb_2$) is in the range of 0.1 to 0.6, the crack occurrence rate is 15% or less, indicating the occurrence of the crack is further suppressed. From the above, it has been confirmed that the occurrence of the crack is further suppressed when the separation distance $La_1$ is 0.1 to 0.6 times as great as the width $Lb_1$ and the separation distance $La_2$ is 0.1 to 0.6 times as great as the width $Lb_2$.

In Examples 10 to 17, the ratio (d2/d1) of the thickness d2 to the thickness d1 differs in a range of 1 to 18. The measurement results in Examples 10 to 17 are illustrated in Table 2.

TABLE 2

| EXAMPLE | d2/d1 | CRACK OCCURRENCE RATE (%) |
|---|---|---|
| 10 | 1 | 15 |
| 11 | 1.5 | 9 |
| 12 | 3 | 8 |
| 13 | 6 | 7 |
| 14 | 9 | 7 |
| 15 | 12 | 6 |
| 16 | 15 | 5 |
| 17 | 18 | 6 |

As illustrated in Table 2, the crack occurrence rate was 15% or less, indicating that the occurrence of the crack is suppressed, in any case of Examples 10 to 17. In the case of Examples 11 to 17, that is, when the ratio (d2/d1) is 1.5 or more, the crack occurrence rate is 9% or less, indicating that the occurrence of the crack is further suppressed. From the above, it was confirmed that the occurrence of the crack is further suppressed when the ratio (d2/d1) is 1.5 or more.

In Examples 18 to 24, a surface roughness (maximum height) Rz of the element body 3 differs in a range of 1.0 to 7.0 μm. The measurement results in Examples 18 to 24 are illustrated in Table 3.

TABLE 3

| EXAMPLE | SURFACE ROUGHNESS Rz (μm) | CRACK OCCURRENCE RATE (%) |
|---|---|---|
| 18 | 1 | 15 |
| 19 | 2 | 8 |
| 20 | 3 | 1 |
| 21 | 4 | 0 |
| 22 | 5 | 0 |
| 23 | 6 | 0 |
| 24 | 7 | 5 |

As illustrated in Table 3, the crack occurrence rate was 15% or less, indicating that the occurrence of the crack is suppressed, in any case of Examples 18 to 24. In the case of Examples 20 to 23, that is, when the surface roughness Rz is 3.0 to 6.0 μm, the crack occurrence rate is 1% or less, indicating that the occurrence of the crack is further suppressed. From the above, it was confirmed that occurrence of the crack is further suppressed when the surface roughness Rz of the element body 3 is 3.0 to 6.0 μm.

Second Embodiment

Next, a multilayer ceramic capacitor according to a second embodiment will be described with reference to FIG. 9. Although not illustrated, the multilayer ceramic capacitor according to the second embodiment includes the element body 3 and the pair of terminal electrodes 5 and 6, as with the multilayer ceramic capacitor 1. Also in the second embodiment, the element body 3 is configured by stacking the plurality of dielectric layers 4 and the plurality of internal electrodes 11, 12, 13, and 14 in the Z direction.

FIGS. 9A to 9D are plan views corresponding to FIGS. 4A to 4D, respectively. As illustrated in FIGS. 9A to 9D, in the second embodiment, the shapes of the connecting portions 11b to 14b or the internal electrodes 11 to 14 are different from the shapes in the first embodiment. Each of the connecting portions 11b to 14b is not rectangular but has a substantially L shape. In FIGS. 9A to 9D, a boundary between the main electrode portions 11a to 14a and the connecting portions 11b to 14b is indicated by a one-dot chain line. Hereinafter, the width is the length in the X direction.

As illustrated in FIG. 9A, the connecting portion 11b includes a narrow portion $11b_1$ and a wide portion $11b_2$. The narrow portion $11b_1$ has a width narrower than the width of the main electrode portion 11a. The wide portion $11b_2$ has a width greater than the width of the narrow portion $11b_1$. The narrow portion $11b_1$ is located between the terminal electrode 5 and the wide portion $11b_2$, and connects the terminal electrode 5 with the wide portion $11b_2$. The narrow portion $11b_1$ electrically connects the terminal electrode 5 with the wide portion $11b_2$. The narrow portion $11b_1$ includes the end portion 11c. The narrow portion $11b_1$ has a rectangular shape, for example. The width of the narrow portion $11b_1$ is half of the width of the main electrode portion 11a, or less, for example. The wide portion $11b_2$ is located between the narrow portion $11b_1$ and the main electrode portion 11a, and connects the narrow portion $11b_1$ with the main electrode portion 11a. The wide portion $11b_2$ electrically connects the narrow portion $11b_1$ with the main electrode portion 11a. The wide portion $11b_2$ has a rectangular shape, for example. The width of the wide portion $11b_2$ is, for example, the same as the width of the main electrode portion 11a.

As illustrated in FIG. 9B, the connecting portion 12b includes a narrow portion $12b_1$ and a wide portion $12b_2$. The narrow portion $12b_1$ has a width narrower than the width of the main electrode portion 12a. The wide portion $12b_2$ has a width greater than the width of the narrow portion $12b_1$. The narrow portion $12b_1$ is located between the terminal electrode 6 and the wide portion $12b_2$ and connects the terminal electrode 6 with the wide portion $12b_2$. The narrow portion $12b_1$ electrically connects the terminal electrode 6 with the wide portion $12b_2$. The narrow portion $12b_1$ includes the end portion 12c. The narrow portion $12b_1$ has a rectangular shape, for example. The width of the narrow portion $12b_1$ is half of the width of the main electrode portion 12a, or less, for example. The wide portion $12b_2$ is located between the narrow portion $12b_1$ and the main electrode portion 12a, and connects the narrow portion $12b_1$ with the main electrode portion 12a. The wide portion $12b_2$ electrically connects the narrow portion $12b_1$ with the main electrode portion 12a. The wide portion $12b_2$ has a rectangular shape, for example. The width of the wide portion $12b_2$ is, for example, the same as the width of the main electrode portion 12a.

As illustrated in FIG. 9C, the connecting portion 13b includes a narrow portion $13b_1$ and a wide portion $13b_2$. The narrow portion $13b_1$ has a width narrower than the width of the main electrode portion 13a. The wide portion $13b_2$ has a width greater than the width of the narrow portion $13b_1$. The narrow portion $13b_1$ is located between the terminal electrode 5 and the wide portion $13b_2$, and connects the terminal electrode 5 with the wide portion $13b_2$. The narrow portion $13b_1$ electrically connects the terminal electrode 5 with the wide portion $13b_2$. The narrow portion $13b_1$ includes the end portion 13c. The narrow portion $13b_1$ has a rectangular shape, for example. The width of the narrow portion $13b_1$ is half of the width of the main electrode portion 13a, or less, for example. The wide portion $13b_2$ is located between the narrow portion $13b_1$ and the main electrode portion 13a, and connects the narrow portion $13b_1$ with the main electrode portion 13a. The wide portion $13b_2$ electrically connects the narrow portion $13b_1$ with the main electrode portion 13a. The wide portion $13b_2$ has a rectangular shape, for example. The width of the wide portion $13b_2$ is, for example, the same as the width of the main electrode portion 13a.

As illustrated in FIG. 9D, the connecting portion 14b includes a narrow portion $14b_1$ and a wide portion $14b_2$. The narrow portion $14b_1$ has a width narrower than the width of the main electrode portion 14a. The wide portion $14b_2$ has a width greater than the width of the narrow portion $14b_1$. The narrow portion $14b_1$ is located between the terminal electrode 6 and the wide portion $14b_2$, and connects the terminal electrode 6 with the wide portion $14b_2$. The narrow portion $14b_1$ electrically connects the terminal electrode 6 with the wide portion $14b_2$. The narrow portion $14b_1$ includes the end portion 14c. The narrow portion $14b_1$ has a rectangular shape, for example. The width of the narrow portion $14b_1$ is half of the width of the main electrode portion 14a, or less, for example. The wide portion $14b_2$ is located between the narrow portion $14b_1$ and the main electrode portion 14a, and connects the narrow portion $14b_1$ with the main electrode portion 14a. The wide portion $14b_2$ electrically connects the narrow portion $14b_1$ with the main electrode portion 14a. The wide portion $14b_2$ has a rectangular shape, for example. The width of the wide portion $14b_2$ is, for example, the same as the width of the main electrode portion 14a.

In the first embodiment, when viewed from the Z direction, the position of the formation region of the connecting portion 11b is generally different from the position of the formation region of the connecting portion 13b, and the position of the formation region of the connecting portion 12b is generally different from the position of the formation region of the portion 14b. In the second embodiment, when viewed from the Z direction, the position of the formation region of the connecting portion 11b is partially aligned with the position of the formation region of the connecting portion 13b, and the position of the formation region of the connecting portion 12b is partially aligned with the position of the formation region of the connecting portion 14b.

When viewed from the Z direction, the narrow portion $11b_1$ and the narrow portion $13b_1$ are located not to overlap with each other, and the wide portion $11b_2$ and the wide portion $13b_2$ are located to overlap with each other. When viewed from the Z direction, the narrow portion $12b_1$ and the narrow portion $14b_1$ are located not to overlap with each other, and the wide portion $12b_2$ and the wide portion $14b_2$ are located to overlap with each other.

When viewed from the Z direction, the narrow portion $11b_1$ is located closer to the side surface 3c and the narrow portion $13b_1$ is located closer to the side surface 3d, between the end surface 3a and the wide portion $11b_2$. When viewed from the Z direction, the narrow portion $12b_1$ is located closer to the side surface 3c and the narrow portion $14b_1$ is located closer to the side surface 3d, between the end surface 3b and the wide portion $14b_2$.

In the second embodiment, as with the first embodiment, the end portion 11c and the end portion 13c are located not to overlap with each other when viewed from the Z direction, and the end portion 12c and the end portion 14c are located not to overlap with each other when viewed from the Z direction. When the end surface 3a is viewed, the end portions 11c and 13c are alternately arranged in a plurality of rows. When the end surface 3b is viewed, the end portions 12c and 14c are alternately arranged in a plurality of rows.

When viewed from the Z direction, the wide portion $11b_2$ is located between a region in which the main electrode portions $11a$ to $14a$ overlap with each other and a region in which the narrow portion $11b_1$ is arranged. When viewed from the Z direction, the wide portion $13b_2$ is located between the region in which the main electrode portions $11a$ to $14a$ overlap with each other and a region in which the narrow portion $13b_1$ is arranged.

When viewed from the Z direction, a region in which the wide portions $11b_2$ and $13b_2$ are arranged is located close to the region in which the main electrode portions $11a$ to $14a$ overlap with each other. In the second embodiment, the region in which the wide portions $11b_2$ and $13b_2$ are arranged is adjacent to the region in which the main electrode portions $11a$ to $14a$ overlap with each other. When viewed in the Z direction, the wide portion $11b_2$ and the wide portion $13b_2$ overlap with each other without having the main electrode portions $11a$ to $14a$ therebetween. This leads to a gentle level difference generated between the region in which the main electrode portions $11a$ to $14a$ overlap with each other and the region close to the region in which the main electrode portions $11a$ to $14a$ overlap with each other.

When viewed from the Z direction, the wide portion $12b_2$ is located between the region in which the main electrode portions $11a$ to $14a$ overlap with each other and a region in which the narrow portion $12b_1$ is arranged. When viewed in the Z direction, the wide portion $14b_2$ is located between a region in which the main electrode portions $11a$ to $14a$ are overlapped with each other and a region in which the narrow portion $14b_1$ is arranged.

When viewed from the Z direction, a region in which the wide portions $12b_2$ and $14b_2$ are arranged is located close to the region in which the main electrode portions $11a$ to $14a$ overlap with each other. In the second embodiment, the region in which the wide portions $12b_2$ and $14b_2$ are arranged is adjacent to the region in which the main electrode portions $11a$ to $14a$ overlap with each other. When viewed in the Z direction, the wide portion $12b_2$ and the wide portion $14b_2$ overlap with each other without having the main electrode portions $11a$ to $14a$ therebetween. This leads to a gentle level difference generated between the region in which the main electrode portions $11a$ to $14a$ overlap with each other and the region close to the region in which the main electrode portions $11a$ to $14a$ overlap with each other.

As described above, also in the second embodiment, the end portions $11c$ and $13c$ are alternately arranged in a plurality of rows when the end surface $3a$ is viewed. Therefore, in the multilayer ceramic capacitor according to the second embodiment, the residual stresses that concentrate on the connecting portions $11b$ and $13b$ are dispersed, as compared with a configuration where the end portions $11c$ and $13c$ are arranged in a same row. When the end surface $3b$ is viewed, the end portions $12c$ and $14c$ are alternately arranged in a plurality of rows. Therefore, in the multilayer ceramic capacitor according to the second embodiment, the residual stresses that concentrate on the connecting portions $12b$ and $14b$ are dispersed, as compared with a configuration where the end portions $12c$ and $14c$ are arranged in a same row. As a result of dispersion of the residual stresses that concentrate on the connecting portions $11b$ to $14b$, the occurrence of the crack attributed to the residual stresses is suppressed in the second embodiment.

The element body 3 might have a local level difference generated between the region in which the main electrode portions $11a$ to $14a$ overlap with each other and a region close to the region in which the main electrode portions $11a$ to $14a$ overlap with each other. The local level difference is attributed to the thickness of the main electrode portions $11a$ to $14a$. The local level difference might be one of the factors of a crack.

In the second embodiment, when viewed from the Z direction, a region in which the wide portions $11b_2$ and $13b_2$ are arranged and a region in which the wide portions $12b_2$ and $14b_2$ are arranged are located close to the region in which the main electrode portions $11a$ to $14a$ overlap with each other. This leads to the gentle level difference generated between the region in which the main electrode portions $11a$ to $14a$ overlap with each other and the region close to the region in which the main electrode portions $11a$ to $14a$ overlap with each other, and thus, the level difference is unlikely to cause a crack. As a result, in the second embodiment, the occurrence of the crack caused by the level difference is suppressed.

Third Embodiment

Next, a multilayer ceramic capacitor according to a third embodiment will be described with reference to FIG. 10. Although not illustrated, the multilayer ceramic capacitor according to the third embodiment includes the element body 3 and the pair of terminal electrodes 5 and 6, as with the multilayer ceramic capacitor 1. Also in the third embodiment, the element body 3 is configured by stacking the plurality of dielectric layers 4 and the plurality of internal electrodes 11, 12, 13, and 14 in the Z direction.

FIG. 10A to 10D are plan views corresponding to FIGS. 4A to 4D, respectively. As illustrated in FIGS. 10A to 10D, in the third embodiment, the shapes of the main electrode portions $11a$ to $14a$ of the internal electrodes 11 to 14 are different from the shapes in the first embodiment. Each of the main electrode portions $11a$ to $14a$ is not rectangular but has a substantially L shape. In FIG. 10A to 10D, a boundary between the main electrode portions $11a$ to $14a$ and the connecting portions $11b$ to $14b$ is indicated by a one-dot chain line. Hereinafter, the width is the length in the X direction.

Figure 10A:
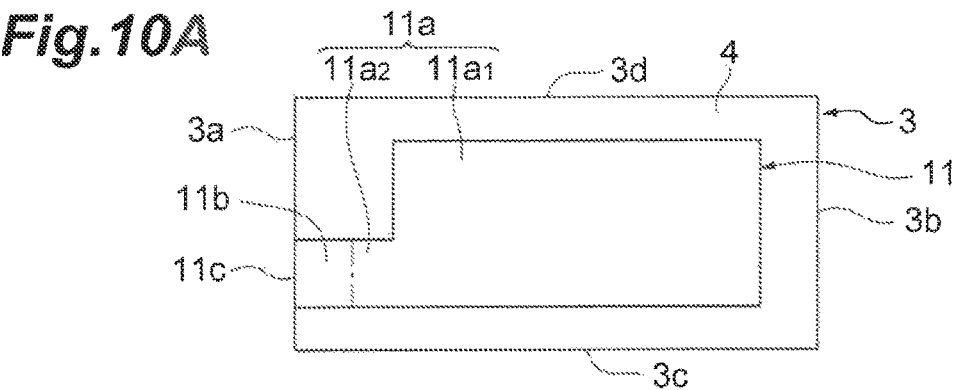
FIGS. 10A, 10B, 10C, and 10D are plan views each illustrating an internal electrode included in a multilayer ceramic capacitor according to a third embodiment.

As illustrated in FIG. 10A, the main electrode portion $11a$ includes a wide portion $11a_1$ and a narrow portion $11a_2$. The wide portion $11a_1$ has a width greater than the width of the connecting portion $11b$. The narrow portion $11a_2$ has a width narrower than the width of the wide portion $11a_1$. The wide portion $11a_1$ is connected with the narrow portion $11a_2$. The wide portion $11a_1$ has a rectangular shape, for example. The width of the wide portion $11a_1$ is, for example, twice or more as great as the width of the connecting portion $11b$. The narrow portion $11a_2$ is located between the wide portion $11a_1$ and the connecting portion $11b$, and connects the wide portion $11a_1$ with the connecting portion $11b$. The narrow portion $11a_2$ electrically connects the wide portion $11a_1$ with the connecting portion $11b$. The narrow portion $11a_2$ has a rectangular shape, for example. The width of the narrow portion $11a_2$ is, for example, the same as the width of the connecting portion $11b$.

Figure 10B:
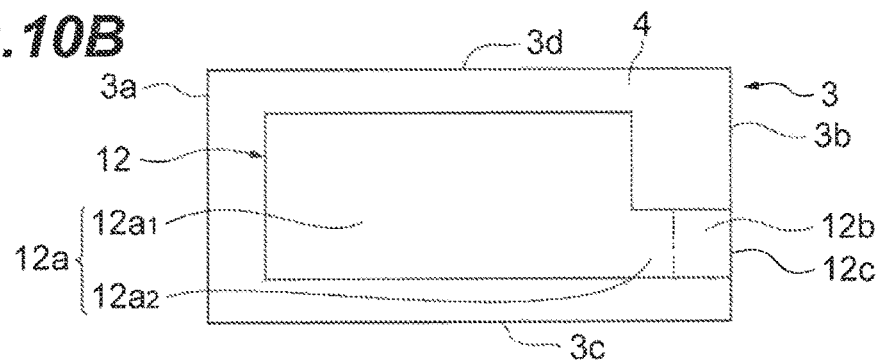

As illustrated in FIG. 10B, the main electrode portion $12a$ includes a wide portion $12a_1$ and a narrow portion $12a_2$. The wide portion $12a_1$ has a width greater than the width of the connecting portion $12b$. The narrow portion $12a_2$ has a width narrower than the width of the wide portion $12a_1$. The wide portion $12a_1$ is connected with the narrow portion $12a_2$. The wide portion $12a_1$ has a rectangular shape, for example. The width of the wide portion $12a_1$ is, for example, twice or more as great as the width of the connecting portion $12b$. The narrow portion $12a_2$ is located between the wide portion $12a_1$ and the connecting portion $12b$, and connects the wide portion $12a_1$ with the connecting portion $12b$. The narrow portion $12a_2$ electrically connects the wide portion $12a_1$ with the connecting portion $12b$. The narrow portion $12a_2$ has a rectangular shape, for example. The width of the narrow portion $12a_2$ is, for example, the same as the width of the connecting portion $12b$.

Figure 10C:
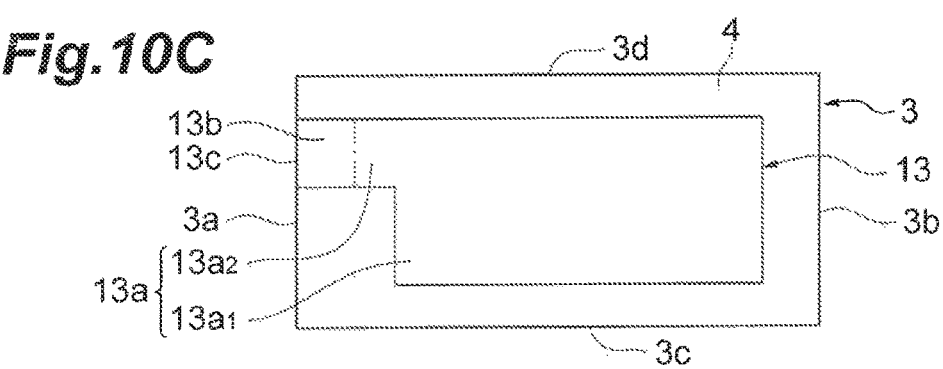

As illustrated in FIG. 10C, the main electrode portion $13a$ includes a wide portion $13a_1$ and a narrow portion $13a_2$. The wide portion $13a_1$ has a width greater than the width of the connecting portion $13b$. The narrow portion $13a_2$ has a width narrower than the width of the wide portion $13a_1$. The wide portion $13a_1$ is connected with the narrow portion $13a_2$. The wide portion $13a_1$ has a rectangular shape, for example. The width of the wide portion $13a_1$ is, for example, twice or more as great as the width of the connecting portion $13b$. The narrow portion $13a_2$ is located between the wide portion $13a_1$ and the connecting portion $13b$, and connects the wide portion $13a_1$ with the connecting portion $13b$. The narrow portion $13a_2$ electrically connects the wide portion $13a_1$ with the connecting portion $13b$. The narrow portion $13a_2$ has a rectangular shape, for example. The width of the narrow portion $13a_2$ is, for example, the same as the width of the connecting portion $13b$.

Figure 10D:
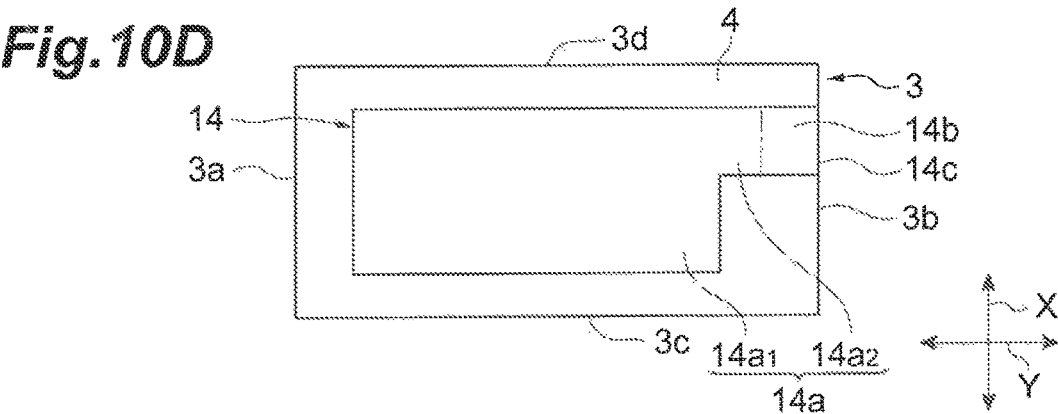

As illustrated in FIG. 10D, the main electrode portion $14a$ includes a wide portion $14a_1$ and a narrow portion $14a_2$. The wide portion $14a_1$ has a width greater than the width of the connecting portion $14b$. The narrow portion $14a_2$ has a width narrower than the width of the wide portion $14a_1$. The wide portion $14a_1$ is connected with the narrow portion $14a_2$. The wide portion $14a_1$ has a rectangular shape, for example. The width of the wide portion $14a_1$ is, for example, twice or more as great as the width of the connecting portion $14b$. The narrow portion $14a_2$ is located between the wide portion $14a_1$ and the connecting portion $14b$, and connects the wide portion $14a_1$ with the connecting portion $14b$. The narrow portion $14a_2$ electrically connects the wide portion $14a_1$ with the connecting portion $14b$. The narrow portion $14a_2$ has a rectangular shape, for example. The width of the narrow portion $14a_2$ is, for example, the same as the width of the connecting portion $14b$.

As illustrated in FIGS. 10A to 10D, each of the widths of the narrow portions $11a_2$ and $13a_2$ is narrower than each of the widths of the wide portions $12a_1$ and $14a_1$, respectively. Each of the widths of the narrow portions $12a_2$ and $14a_2$ is narrower than each of the widths of the wide portions $11a_1$ and $13a_1$, respectively.

In the first embodiment, when viewed from the Z direction, the position of the formation region of the main electrode portion $11a$ and the position of the formation region of the main electrode portion $13a$ are generally aligned with each other, and the position of the formation region of the main electrode portion $12a$ and the position of the formation region of the main electrode portion $14a$ are generally aligned with each other. In the third embodiment, when viewed from the Z direction, the position of the formation region of the main electrode portion $11a$ is partially different from the position of the formation region of the main electrode portion $13a$, and the position of the formation region of the main electrode portion $12a$ is partially different from the position of the formation region of the main electrode portion $14a$.

When viewed from the Z direction, the wide portion $11a_1$ and the wide portion $13a_1$ are located to overlap with each other, and the narrow portion $11a_2$ and the narrow portion $13a_2$ are located not to overlap with each other. When viewed from the Z direction, the wide portion $12a_1$ and the wide portion $14a_1$ are located to overlap with each other, and the narrow portion $12a_2$ and the narrow portion $14a_2$ are located not to overlap with each other.

When viewed from the Z direction, the narrow portion $11a_2$ is located between a region in which the wide portions $11a_1$, $13a_1$ and the wide portions $12a_1$, $14a_1$ overlap with each other and a region in which the connecting portion $11b$ is arranged. When viewed from the Z direction, the narrow portion $13a_2$ is located between the region in which the wide portions $11a_1$ and $13a_1$ overlap with the wide portions $12a_1$ and $14a_1$, respectively, and the region in which the connecting portion $13b$ is arranged.

When viewed from the Z direction, the narrow portions $11a_2$ and $13a_2$ overlap with the wide portions $12a_1$ and $14a_1$, respectively. When viewed from the Z direction, the narrow portion $11a_2$ overlaps with a region close to the end surface $3a$ and the side surface $3c$ in the wide portions $12a_1$ and $14a_1$, and the narrow portion $13a_2$ overlaps with a region close to the end surface $3a$ and the side surface $3d$ in the wide portions $12a_1$ and $14a_1$. Therefore, when viewed from the Z direction, a region in which the wide portion $12a_1$ and the wide portion $14a_1$ overlap with each other without having the narrow portions $11a_2$ and $13a_2$ therebetween is formed between the narrow portion $11a_2$ and the narrow portion $13a_2$.

When viewed from the Z direction, the region in which the wide portion $12a_1$ and the wide portion $14a_1$ overlap with each other without having the narrow portions $11a_2$ and $13a_2$ therebetween is located close to the region in which the wide portions $11a_1$ and $13a_1$ and the wide portions $12a_1$ and $14a_1$ overlap with each other, respectively. In the third embodiment, the region in which the wide portion $12a_1$ and the wide portion $14a_1$ overlap with each other without having the narrow portions $11a_2$ and $13a_2$ therebetween is adjacent to the region in which the wide portions $11a_1$ and $13a_1$ overlap with the wide portions $12a_1$ and $14a_1$, respectively. This leads to a gentle level difference generated between the region in which the wide portions $11a_1$ and $13a_1$ overlap with the wide portions $12a_1$ and $14a_1$, respectively, and a region close to the region in which the wide portions $11a_1$ and $13a_1$ overlap with the wide portions $12a_1$ and $14a_1$, respectively.

When viewed from the Z direction, the narrow portion $12a_2$ is located between the region in which the wide portions $11a_1$ and $13a_1$ overlap with the wide portions $12a_1$ and $14a_1$, and the region in which the connecting portion $12b$ is arranged. When viewed from the Z direction, the narrow portion $14a_2$ is located between the region in which the wide portions $11a_1$ and $13a_1$ overlap with the wide portions $12a_1$ and $14a_1$, respectively, and the region in which the connecting portion $14b$ is arranged.

When viewed from the Z direction, the narrow portions $12a_2$ and $14a_2$ overlap with the wide portions $11a_1$ and $13a_1$ respectively. When viewed from the Z direction, the narrow portion $12a_2$ overlaps with a region close to the end surface $3b$ and the side surface $3c$ in the wide portions $11a_1$ and $13a_1$, and the narrow portion $14a_2$ overlaps with a region close to the end surface $3b$ and the side surface $3d$ in the wide portions $11a_1$ and $13a_1$. Therefore, when viewed from the Z direction, a region in which the wide portion $11a_1$ and the wide portion $13a_1$ overlap with each other without having the narrow portions $12a_2$ and $14a_2$ therebetween is formed between the narrow portion $12a_2$ and the narrow portion $14a_2$.

When viewed from the Z direction, the region in which the wide portion $11a_1$ and the wide portion $13a_1$ overlap with each other without having the narrow portions $12a_2$ and $14a_2$ therebetween is located close to the region in which the wide portions $11a_1$ and $13a_1$ and the wide portions $12a_1$ and $14a_1$ overlap with each other, respectively. In the third embodiment, the region in which the wide portion $11a_1$ and the wide portion $13a_1$ overlap with each other without having the narrow portions $12a_2$ and $14a_2$ therebetween is adjacent to the region in which the wide portions $11a_1$ and $13a_1$ overlap with the wide portions $12a_1$ and $14a_1$, respectively. This leads to a gentle level difference generated between the region in which the wide portions $11a_1$ and $13a_1$ overlap with the wide portions $12a_1$ and $14a_1$, respectively, and a region close to the region in which the wide portions $11a_1$ and $13a_1$ overlap with the wide portions $12a_1$ and $14a_1$, respectively.

As described above, also in the third embodiment, as a result of dispersion of the residual stresses that concentrate on the connecting portions $11b$ to $14b$, the occurrence of the crack attributed to the residual stresses is suppressed, as with the first and second embodiments.

In the third embodiment, when viewed from the Z direction, the narrow portions $12a_2$ and $14a_2$ overlap with the wide portions $11a_1$ and $13a_1$ respectively, and the narrow portions $11a_2$ and $13a_2$ overlap with the wide portions $12a_1$ and $14a_1$, respectively. When viewed from the Z direction, the region in which the wide portions $11a_1$ and $13a_1$ overlap with each other without having the narrow portions $12a_2$ and $14a_2$ therebetween and the region in which the wide portions $12a_1$ and $14a_1$ overlap with each other without having the narrow portions $11a_2$ and $13a_2$ therebetween are located close to the region in which the wide portions $11a_1$ and $13a_1$ and the wide portions $12a_1$ and $14a_1$ overlap with each other, respectively. This leads to the gentle level difference generated between the region in which the wide portions $11a_1$ and $13a_1$ overlap with the wide portions $12a_1$ and $14a_1$, respectively, and the region which is close to the region in which the wide portions $11a_1$ and $13a_1$ overlap with the wide portions $12a_1$ and $14a_1$, respectively, and thus, the level difference is unlikely to cause the crack. As a result, in the third embodiment, the occurrence of the crack is suppressed.

While various embodiments of the present invention have been described hereinabove, the present invention is not limited to the above-described embodiments, but may include modifications and other applications obtained within the spirit and scope described in attached claims.

As long as the effects of the present invention are achieved, the arrangement order of the internal electrodes in the stacking direction is not limited to the arrangement order described in the above embodiment. For example, in the above embodiment, arrangement is in the order of the internal electrode 11, the internal electrode 12, the internal electrode 13, and the internal electrode 14. The arrangement, however, may be in the order of the internal electrode 11, the internal electrode 14, the internal electrode 13, and the internal electrode 12. For example, the internal electrode 11 and the internal electrode 13 may be alternately arranged in succession, and the internal electrode 12 and the internal electrode 14 may be alternately arranged in succession.

The shape of each of the internal electrodes 11 to 14 is not limited to the shape disclosed in the above-described embodiments. For example, the internal electrodes 11 to 14 having the shape exemplified in the first embodiment and the internal electrodes 11 to 14 having the shape exemplified in the second or third embodiment may be mixed in one multilayer ceramic capacitor.

The separation distance $La_1$ need not be 0.1 to 0.6 times as great as the width $Lb_1$. The separation distance $La_2$ need not be 0.1 to 0.6 times as great as the width $Lb_2$.

The ratio (d2/d1) of the thickness d2 to the thickness d1 need not be 1.5 or more.

The surface roughness of the element body 3 need not be 3.0 to 6.0 μm.

What is claimed is:

1. A multilayer ceramic capacitor comprising:
an element body having a first end surface and a second end surface that oppose each other in a first direction;
a first terminal electrode disposed on the first end surface of the element body; and
a second terminal electrode disposed on the second end surface of the element body; wherein:
the element body includes a plurality of dielectric layers containing one of $CaZrO_3$ and $SrZrO_3$ as a main component and a plurality of internal electrodes containing Ni as a main component, being alternately disposed in a second direction,
the plurality of internal electrodes includes a plurality of first internal electrodes connected to the first terminal electrode and a plurality of second internal electrodes connected to the second terminal electrode,
each of the first internal electrodes includes
a first main electrode portion, and
a first connecting portion configured to connect the first main electrode portion with the first terminal electrode and including a first end portion connected with the first terminal electrode,
each of the second internal electrodes includes
a second main electrode portion, and
a second connecting portion configured to connect the second main electrode portion with the second terminal electrode and including a second end portion connected with the second terminal electrode,
the first end portions of the first connecting portions adjacent to each other in the second direction are located not to overlap with each other when viewed from the second direction,
the second end portions of the second connecting portions adjacent to each other in the second direction are located not to overlap with each other when viewed from the second direction,
a surface roughness of the element body is 3.0 to 6.0 μm,
the element body includes first and second opposing outer surfaces in the second direction, and
the element body is mounted on an electric device such that the first opposing outer surface faces the electric device.

2. The multilayer ceramic capacitor according to claim 1, wherein the first end portions of the first connecting portions adjacent to each other in the second direction are separated from each other in a third direction orthogonal to the first direction and the second direction,
spacing of the first end portions separated from each other in the third direction is 0.1 to 0.6 times as great as a width of the first main electrode portion in the third direction,
the second end portions of the second connecting portions adjacent to each other in the second direction are separated from each other in the third direction, and
spacing of the second end portions separated from each other in the third direction is 0.1 to 0.6 times as great as a width of the second main electrode portion in the third direction.

3. The multilayer ceramic capacitor according to claim 1, wherein a ratio of a thickness of the dielectric layer to a thickness of the internal electrode is 1.5 or more.

4. The multilayer ceramic capacitor according to claim 1, wherein:

the first connecting portion includes a first narrow portion connected to the first terminal electrode and having a width narrower than a width of the first main electrode portion, and a first wide portion (1) in contact with the first narrow portion and the first main electrode portion, (2) configured to connect the first narrow portion with the first main electrode portion and (3) having a width greater than the width of the first narrow portion, the second connecting portion includes a second narrow portion connected to the second terminal electrode and having a width narrower than a width of the second main electrode portion, and a second wide portion (1) in contact with the second narrow portion and the second main electrode portion, (2) configured to connect the second narrow portion with the second main electrode portion and (3) having a width greater than the width of the second narrow portion, when viewed from the second direction, the first wide portion is located between a first region in which the first main electrode portion and the second main electrode portion overlap with each other and a second region in which the first narrow portion is arranged, and when viewed from the second direction, the second wide portion is located between the first region and a third region in which the second narrow portion is arranged.

5. The multilayer ceramic capacitor according to claim 1, wherein:

the first main electrode portion includes a third wide portion having a width greater than a width of the first connecting portion, and a third narrow portion (1) in contact with the third wide portion and the first connecting portion, (2) configured to connect the third wide portion with the first connecting portion and (3) having a width narrower than the width of the third wide portion, the second main electrode portion includes a fourth wide portion having a width greater than a width of the second connecting portion and a fourth narrow portion (1) in contact with the fourth wide portion and the second connecting portion, (2) configured to connect the fourth wide portion with the second connecting portion and (3) having a width narrower than the width of the fourth wide portion, the width of the third narrow portion is narrower than the width of the fourth wide portion, and the width of the fourth narrow portion is narrower than the width of the third wide portion, the third narrow portion overlaps with the fourth wide portion when viewed from the second direction, and the fourth narrow portion overlaps with the third wide portion when viewed from the second direction.

6. A multilayer ceramic capacitor comprising:

an element body having a first end surface and a second end surface that oppose each other in a first direction, a pair of outer principal surfaces that opposes each other, and a pair of side surfaces that opposes each other;

a first terminal electrode disposed on the first end surface of the element body; and a second terminal electrode disposed on the second end surface of the element body, wherein:

the element body includes a plurality of dielectric layers containing one of $CaZrO_3$ and $SrZrO_3$ as a main component and a plurality of internal electrodes containing Ni as a main component, being alternately disposed in a second direction, an area of each of the first and second end surfaces is smaller than an area of (1) each of the principal surfaces and (2) each of the side surfaces, the plurality of internal electrodes includes a plurality of first internal electrodes connected to the first terminal electrode and a plurality of second internal electrodes connected to the second terminal electrode, each of the first internal electrodes includes a first main electrode portion along the first direction, and a first connecting portion configured to directly connect the first main electrode portion with the first terminal electrode and including a first end portion connected with the first terminal electrode, each of the second internal electrodes includes a second main electrode portion along the first direction, and a second connecting portion configured to directly connect the second main electrode portion with the second terminal electrode and including a second end portion connected with the second terminal electrode, the first end portions of the first connecting portions adjacent to each other in the second direction are located not to overlap with each other when viewed from the second direction, the second end portions of the second connecting portions adjacent to each other in the second direction are located not to overlap with each other when viewed from the second direction, a surface roughness of the element body is 3.0 to 6.0 µm, and the element body is mounted on an electric device such that one of the pair of principal surfaces faces the electric device.

7. The multilayer ceramic capacitor according to claim 6, wherein the first end portions of the first connecting portions adjacent to each other in the second direction are separated from each other in a third direction orthogonal to the first direction and the second direction, spacing of the first end portions separated from each other in the third direction is 0.1 to 0.6 times as great as a width of the first main electrode portion in the third direction, the second end portions of the second connecting portions adjacent to each other in the second direction are separated from each other in the third direction, and spacing of the second end portions separated from each other in the third direction is 0.1 to 0.6 times as great as a width of the second main electrode portion in the third direction.

8. The multilayer ceramic capacitor according to claim 6, wherein a ratio of a thickness of the dielectric layer to a thickness of the internal electrode is 1.5 or more.

9. The multilayer ceramic capacitor according to claim 6, wherein:

the first connecting portion includes a first narrow portion connected to the first terminal electrode and having a width narrower than a width of the first main electrode portion, and a first wide portion (1) in contact with the first narrow portion and the first main electrode portion, (2) configured to connect the first narrow portion with the first main electrode portion and (3) having a width greater than the width of the first narrow portion,
the second connecting portion includes
a second narrow portion connected to the second terminal electrode and having a width narrower than a width of the second main electrode portion, and
a second wide portion (1) in contact with the second narrow portion and the second main electrode portion, (2) configured to connect the second narrow portion with the second main electrode portion and (3) having a width greater than the width of the second narrow portion,
when viewed from the second direction, the first wide portion is located between a first region in which the first main electrode portion and the second main electrode portion overlap with each other and a second region in which the first narrow portion is arranged, and
when viewed from the second direction, the second wide portion is located between the first region and a third region in which the second narrow portion is arranged.

10. The multilayer ceramic capacitor according to claim 6,
wherein:
the first main electrode portion includes
a third wide portion having a width greater than a width of the first connecting portion, and
a third narrow portion (1) in contact with the third wide portion and the first connecting portion, (2) configured to connect the third wide portion with the first connecting portion and (3) having a width narrower than the width of the third wide portion,
the second main electrode portion includes
a fourth wide portion having a width greater than a width of the second connecting portion and
a fourth narrow portion (1) in contact with the fourth wide portion and the second connecting portion, (2) configured to connect the fourth wide portion with the second connecting portion and (3) having a width narrower than the width of the fourth wide portion,
the width of the third narrow portion is narrower than the width of the fourth wide portion, and the width of the fourth narrow portion is narrower than the width of the third wide portion,
the third narrow portion overlaps with the fourth wide portion when viewed from the second direction, and
the fourth narrow portion overlaps with the third wide portion when viewed from the second direction.

11. A multilayer ceramic capacitor comprising:
an element body having a first end surface and a second end surface that oppose each other in a first direction;
a first terminal electrode disposed on the first end surface of the element body; and
a second terminal electrode disposed on the second end surface of the element body; wherein:
the element body includes a plurality of dielectric layers containing one of $CaZrO_3$ and $SrZrO_3$ as a main component and a plurality of internal electrodes containing Ni as a main component, being alternately disposed in a second direction,
the plurality of internal electrodes includes a plurality of first internal electrodes connected to the first terminal electrode and a plurality of second internal electrodes connected to the second terminal electrode,
each of the first internal electrodes includes
a first main electrode portion, and
a first connecting portion configured to connect the first main electrode portion with the first terminal electrode and including a first end portion connected with the first terminal electrode,
each of the second internal electrodes includes
a second main electrode portion, and
a second connecting portion configured to connect the second main electrode portion with the second terminal electrode and including a second end portion connected with the second terminal electrode,
the first end portions of the first connecting portions adjacent to each other in the second direction are located not to overlap with each other when viewed from the second direction,
the second end portions of the second connecting portions adjacent to each other in the second direction are located not to overlap with each other when viewed from the second direction,
the first connecting portion includes
a first narrow portion connected to the first terminal electrode and having a width narrower than a width of the first main electrode portion, and
a first wide portion (1) located between the first narrow portion and the first main electrode portion, (2) in contact with the first narrow portion and the first main electrode portion, and (3) having a width same as the width of the first main electrode portion,
the second connecting portion includes
a second narrow portion connected to the second terminal electrode and having a width narrower than a width of the second main electrode portion, and
a second wide portion (1) located between the second narrow portion and the second main electrode portion, (2) in contact with the second narrow portion and the second main electrode portion, and (3) having a width same as the width of the second main electrode portion,
when viewed from the second direction, the first wide portion is located between (1) a first region in which the first main electrode portion and the second main electrode portion overlap with each other and (2) the first narrow portion, and
when viewed from the second direction, the second wide portion is located between (1) the first region and (2) the second narrow portion.

12. The multilayer ceramic capacitor according to claim 11, wherein:
the first end portions of the first connecting portions adjacent to each other in the second direction are separated from each other in a third direction orthogonal to the first direction and the second direction,
spacing of the first end portions separated from each other in the third direction is 0.1 to 0.6 times as great as a width of the first main electrode portion in the third direction,
the second end portions of the second connecting portions adjacent to each other in the second direction are separated from each other in the third direction, and
spacing of the second end portions separated from each other in the third direction is 0.1 to 0.6 times as great as a width of the second main electrode portion in the third direction.

13. The multilayer ceramic capacitor according to claim 11, wherein a ratio of a thickness of the dielectric layer to a thickness of the internal electrode is 1.5 or more.

14. The multilayer ceramic capacitor according to claim 11, wherein a surface roughness of the element body is 3.0 to 6.0 μm.

15. A multilayer ceramic capacitor comprising:
an element body having a first end surface and a second end surface that oppose each other in a first direction;
a first terminal electrode disposed on the first end surface of the element body; and
a second terminal electrode disposed on the second end surface of the element body; wherein:
the element body includes a plurality of dielectric layers containing one of $CaZrO_3$ and $SrZrO_3$ as a main component and a plurality of internal electrodes containing Ni as a main component, being alternately disposed in a second direction,
the plurality of internal electrodes includes a plurality of first internal electrodes connected to the first terminal electrode and a plurality of second internal electrodes connected to the second terminal electrode,
each of the first internal electrodes includes
a first main electrode portion, and
a first connecting portion configured to connect the first main electrode portion with the first terminal electrode and including a first end portion connected with the first terminal electrode,
each of the second internal electrodes includes
a second main electrode portion, and
a second connecting portion configured to connect the second main electrode portion with the second terminal electrode and including a second end portion connected with the second terminal electrode,
the first end portions of the first connecting portions adjacent to each other in the second direction are located not to overlap with each other when viewed from the second direction,
the second end portions of the second connecting portions adjacent to each other in the second direction are located not to overlap with each other when viewed from the second direction,
the first main electrode portion includes
a third wide portion having a width greater than a width of the first connecting portion, and
a third narrow portion (1) located between the third wide portion and the first connecting portion, (2) in contact with the third wide portion and the first connecting portion, and (3) having a width same as the width of the first connecting portion,
the second main electrode portion includes
a fourth wide portion having a width greater than a width of the second connecting portion and
a fourth narrow portion (1) located between the fourth wide portion and the second connecting portion, (2) in contact with the fourth wide portion and the second connecting portion, and (3) having a width same as the width of the second connecting portion,
the width of the third narrow portion is narrower than the width of the fourth wide portion, and the width of the fourth narrow portion is narrower than the width of the third wide portion,
the third narrow portion overlaps with the fourth wide portion when viewed from the second direction, and
the fourth narrow portion overlaps with the third wide portion when viewed from the second direction.

16. The multilayer ceramic capacitor according to claim 15, wherein:
the first end portions of the first connecting portions adjacent to each other in the second direction are separated from each other in a third direction orthogonal to the first direction and the second direction,
spacing of the first end portions separated from each other in the third direction is 0.1 to 0.6 times as great as a width of the first main electrode portion in the third direction,
the second end portions of the second connecting portions adjacent to each other in the second direction are separated from each other in the third direction, and
spacing of the second end portions separated from each other in the third direction is 0.1 to 0.6 times as great as a width of the second main electrode portion in the third direction.

17. The multilayer ceramic capacitor according to claim 15, wherein a ratio of a thickness of the dielectric layer to a thickness of the internal electrode is 1.5 or more.

18. The multilayer ceramic capacitor according to claim 15, wherein a surface roughness of the element body is 3.0 to 6.0 μm.

19. A multilayer ceramic capacitor comprising:
an element body having a first end surface and a second end surface that oppose each other in a first direction, a pair of principal surfaces that opposes each other, and a pair of side surfaces that opposes each other;
a first terminal electrode disposed on the first end surface of the element body; and
a second terminal electrode disposed on the second end surface of the element body, wherein:
the element body includes a plurality of dielectric layers containing one of $CaZrO_3$ and $SrZrO_3$ as a main component and a plurality of internal electrodes containing Ni as a main component, being alternately disposed in a second direction,
an area of each of the first and second end surfaces is smaller than an area of (1) each of the principal surfaces and (2) each of the side surfaces,
the plurality of internal electrodes includes a plurality of first internal electrodes connected to the first terminal electrode and a plurality of second internal electrodes connected to the second terminal electrode,
each of the first internal electrodes includes
a first main electrode portion, and
a first connecting portion configured to directly connect the first main electrode portion with the first terminal electrode and including a first end portion connected with the first terminal electrode,
each of the second internal electrodes includes
a second main electrode portion, and
a second connecting portion configured to directly connect the second main electrode portion with the second terminal electrode and including a second end portion connected with the second terminal electrode,
the first end portions of the first connecting portions adjacent to each other in the second direction are located not to overlap with each other when viewed from the second direction,
the second end portions of the second connecting portions adjacent to each other in the second direction are located not to overlap with each other when viewed from the second direction,
the first connecting portion includes
a first narrow portion connected to the first terminal electrode and having a width narrower than a width of the first main electrode portion, and
a first wide portion (1) located between the first narrow portion and the first main electrode portion, (2) in contact with the first narrow portion and the first main electrode portion, and (3) having a width same as the width of the first main electrode portion, the second connecting portion includes
a second narrow portion connected to the second terminal electrode and having a width narrower than a width of the second main electrode portion, and
a second wide portion (1) located between the second narrow portion and the second main electrode portion, (2) in contact with the second narrow portion and the second main electrode portion, and (3) having a width same as the width of the second main electrode portion,
when viewed from the second direction, the first wide portion is located between (1) a first region in which the first main electrode portion and the second main electrode portion overlap with each other and (2) the first narrow portion, and
when viewed from the second direction, the second wide portion is located between (1) the first region and (2) the second narrow portion.

20. The multilayer ceramic capacitor according to claim 19, wherein:
the first end portions of the first connecting portions adjacent to each other in the second direction are separated from each other in a third direction orthogonal to the first direction and the second direction,
spacing of the first end portions separated from each other in the third direction is 0.1 to 0.6 times as great as a width of the first main electrode portion in the third direction,
the second end portions of the second connecting portions adjacent to each other in the second direction are separated from each other in the third direction, and
spacing of the second end portions separated from each other in the third direction is 0.1 to 0.6 times as great as a width of the second main electrode portion in the third direction.

21. The multilayer ceramic capacitor according to claim 19, wherein a ratio of a thickness of the dielectric layer to a thickness of the internal electrode is 1.5 or more.

22. The multilayer ceramic capacitor according to claim 19, wherein a surface roughness of the element body is 3.0 to 6.0 μm.

23. A multilayer ceramic capacitor comprising:
an element body having a first end surface and a second end surface that oppose each other in a first direction, a pair of principal surfaces that opposes each other, and a pair of side surfaces that opposes each other;
a first terminal electrode disposed on the first end surface of the element body; and
a second terminal electrode disposed on the second end surface of the element body, wherein:
the element body includes a plurality of dielectric layers containing one of $CaZrO_3$ and $SrZrO_3$ as a main component and a plurality of internal electrodes containing Ni as a main component, being alternately disposed in a second direction,
an area of each of the first and second end surfaces is smaller than an area of (1) each of the principal surfaces and (2) each of the side surfaces,
the plurality of internal electrodes includes a plurality of first internal electrodes connected to the first terminal electrode and a plurality of second internal electrodes connected to the second terminal electrode,
each of the first internal electrodes includes
a first main electrode portion, and
a first connecting portion configured to directly connect the first main electrode portion with the first terminal electrode and including a first end portion connected with the first terminal electrode,
each of the second internal electrodes includes
a second main electrode portion, and
a second connecting portion configured to directly connect the second main electrode portion with the second terminal electrode and including a second end portion connected with the second terminal electrode,
the first end portions of the first connecting portions adjacent to each other in the second direction are located not to overlap with each other when viewed from the second direction,
the second end portions of the second connecting portions adjacent to each other in the second direction are located not to overlap with each other when viewed from the second direction,
the first main electrode portion includes
a third wide portion having a width greater than a width of the first connecting portion, and
a third narrow portion (1) located between the third wide portion and the first connecting portion, (2) in contact with the third wide portion and the first connecting portion, and (3) having a width same as the width of the first connecting portion,
the second main electrode portion includes a fourth wide portion having a width greater than a width of the second connecting portion and
a fourth narrow portion (1) located between the fourth wide portion and the second connecting portion, (2) in contact with the fourth wide portion and the second connecting portion, and (3) having a width same as the width of the second connecting portion,
the width of the third narrow portion is narrower than the width of the fourth wide portion, and the width of the fourth narrow portion is narrower than the width of the third wide portion,
the third narrow portion overlaps with the fourth wide portion when viewed from the second direction, and
the fourth narrow portion overlaps with the third wide portion when viewed from the second direction.

24. The multilayer ceramic capacitor according to claim 23, wherein:
the first end portions of the first connecting portions adjacent to each other in the second direction are separated from each other in a third direction orthogonal to the first direction and the second direction,
spacing of the first end portions separated from each other in the third direction is 0.1 to 0.6 times as great as a width of the first main electrode portion in the third direction,
the second end portions of the second connecting portions adjacent to each other in the second direction are separated from each other in the third direction, and
spacing of the second end portions separated from each other in the third direction is 0.1 to 0.6 times as great as a width of the second main electrode portion in the third direction.

25. The multilayer ceramic capacitor according to claim 23, wherein a ratio of a thickness of the dielectric layer to a thickness of the internal electrode is 1.5 or more.

26. The multilayer ceramic capacitor according to claim 23, wherein a surface roughness of the element body is 3.0 to 6.0 μm.

* * * * *